US010068177B2

(12) United States Patent
Hershey et al.

(10) Patent No.: US 10,068,177 B2
(45) Date of Patent: Sep. 4, 2018

(54) PROCESS OF PROBABILISTIC MULTI-SOURCE MULTI-INT FUSION BENEFIT ANALYSIS

(71) Applicant: Raytheon Company, Waltham, MA (US)

(72) Inventors: Paul C. Hershey, Asburn, VA (US); Thomas P. Deardorff, Spring Mills, PA (US); David J. Wisniewski, State College, PA (US); John J. Williams, Dulles, VA (US); Geoffrey Guisewite, State College, PA (US)

(73) Assignee: Raytheon Company, Waltham, MA (US)

( * ) Notice: Subject to any disclaimer, the term of this patent is extended or adjusted under 35 U.S.C. 154(b) by 820 days.

(21) Appl. No.: 14/600,904

(22) Filed: Jan. 20, 2015

(65) Prior Publication Data

US 2015/0205760 A1 Jul. 23, 2015

Related U.S. Application Data

(60) Provisional application No. 61/929,250, filed on Jan. 20, 2014.

(51) Int. Cl.
*G06F 17/18* (2006.01)
*G06N 5/04* (2006.01)
*G06N 99/00* (2010.01)

(52) U.S. Cl.
CPC ............. *G06N 5/04* (2013.01); *G06N 99/005* (2013.01); *G06F 17/18* (2013.01)

(58) Field of Classification Search
CPC ......... G06F 17/18; G06N 5/04; G06N 99/005
(Continued)

(56) References Cited

U.S. PATENT DOCUMENTS 8,320,499 B2* 11/2012 Blanz ................... H04L 1/0625
370/328
2007/0255672 A1* 11/2007 Olsson .................. G06Q 40/08
706/56

(Continued)

OTHER PUBLICATIONS

Musman et al, Sensor Planning for Elusive Targets.*
(Continued)

*Primary Examiner* — Sujoy Kundu
*Assistant Examiner* — Lynda Dinh
(74) *Attorney, Agent, or Firm* — Renner, Otto, Boisselle & Sklar, LLP

(57) ABSTRACT

A method of fusing sensor detection probabilities. The fusing of detection probabilities may allow a first force to detect an imminent threat from a second force, with enough time to counter the threat. The detection probabilities may include accuracy probability of one or more sensors and an available time probability of the one or more sensors. The detection probabilities allow a determination of accuracy of intelligence gathered by each of the sensors. Also, the detection probabilities allow a determination of a probable benefit of an additional platform, sensor, or processing method. The detection probabilities allow a system or mission analyst to quickly decompose a problem space and build a detailed analysis of a scenario under different conditions including technology and environmental factors.

20 Claims, 20 Drawing Sheets

(58) Field of Classification Search
USPC .......................................................... 702/181
See application file for complete search history.

(56) References Cited

U.S. PATENT DOCUMENTS

2015/0268011 A1* 9/2015 Herman .................. F41H 11/02
701/300
2015/0279809 A1 10/2015 Hegde

OTHER PUBLICATIONS

Molini etal; Real-Time System Scenarios, IEEE, 1990.*
Kopp, Carlo, "High Energy Laser Directed Energy Weapons Technical Report, APA-TR-2008-0501", May 2008, Defense Today, 2006 series, Updated Apr. 2012, Copyright 2006-2012 Carlo Kopp.
Shein, Rob, "A Brief Summary of Cyber Warfare," Information Security Management Handbook, Sixth Edition, vol. 4, edited by Harold F. Tipton and Micki Krause Nozaki, Auerbach Publications, 2010. Copyright 2011-2013 Auerbach Publications.
Defense Science Board, "Task Force Report: Resilient Military Systems and the Advanced Cyber Threat," Jan. 2013, Office of the Under Secretary of Defense for Acquisition, Technology, and Logistics, Washington, D.C.
Missile Defense Agency, "Ballistic Missile Defense Program Overview for the National Defense Industrial Association", May 8, 2008, 08-MDA-3495.
Hershey, P. et al., "A Policy-based Approach to Automated Data Reduction for Intelligence, Surveillance, and Reconnaissance Systems," Copyright 2013, IEEE.
Claims for Hershey, P. et al., "Mathematical Method for Non-kinetic Performance Assessment (M2NPA)," filed Feb. 20, 2014, U.S. Appl. No. 14/185,029.
Wortzel, L., "China's Military Modernization and Cyber Activities," Spring 2014, Strategic Studies Quarterly, vol. 8, No. 1, ISSN 1936-1815, pp. 3-22.
Weiner, S. et al., "Discrimination Performance Requirements for Ballistic Missile Defense," vol. 7, No. 1, 1994, The Lincoln Laboratory Journal, pp. 63-88.
Wilkening, D., "A Simple Model for Calculating Ballistic Missile Defense Effectiveness," Science and Global Security, 1999, vol. 8.2, pp. 183-215.
Peterson, Joshua J., "Appropriate Factors to Consider when Assessing Analytic Confidence in Intelligence Analysis," 2008, Erie, PA: Mercyhurst College.
U.S. Army, "Human Intelligence Collector Operations", Sep. 2006, Field Manual, 202203, Washington, DC: Department of Army.
Robertson, Matthew, "Chinese 'Carrier Killer' Based on US Technology", The Epoch Times. [Online] Jun. 28, 2011, [Cited: Feb. 15, 2013] http://www.theepochtimes.com/n2/china-news/chinese-carrier-killer-based-on-us-technology-57974.html.
"ExtendSim 9 Reference," accessed Nov. 8, 2013, Copyright © 2013 by Imagine That Inc., https://www.extendsim.com/downloads/forms/install_instrucs/ExtendSim%209%20Reference.pdf.
Ishikawa, K. (1968), Guide to Quality Control (Japanese): Gemba No QC Shuho, Tokyo: JUSE Press, Ltd. (check).
Ishikawa, K. (1990), Introduction to Quality Control. (Translation).
Jousselme, Anne-Laure, Dr., "Fusion challenges for target identification under uncertainty," Dec. 2013, DRDC-Valcartier, Command, Control and Intelligence section, RCAF Avionics and Systems Workshop, Ottawa, Canada.
Klir et al., "Uncertainty and Information, Foundations of Generalized Information Theory," Binghamton University-SUNY, Wiley Interscience, Copyright 2006 by John Wiley & Sons, Inc.
Ristic, B. et al., "Target Classification Approach Based on the Belief Function Theory," Apr. 2005, IEEE Trans. on Aerospace and Electronic Systems, vol. 4, No. 2.
Technical Characteristics of the NATO Identification System (NIS), Feb. 11, 2009, NATO STANAG 4162-ED 2.
NATO Standard Identity Description Structure for Tactical Use, (2005), STANAG 1241 Ed. 5.
Nato Industrial Advisory Group (NIAG), Update for NDIA International Division, Jul. 10, 2013.
Claims for Hershey, P. et al., "System and Method for Asymmetric Missile Defense," patent filed Jan. 20, 2014, U.S. Appl. No. 61/929,252, U.S. Appl. No. 14/600,920.
Claims for Hershey, P. et al., "Digital Weapons Factory and Digital Operations Center for Producing, Deploying, Assessing, and Managing Digital Defects," patent filed Jan. 20, 2014, U.S. Appl. No. 61/929,247, U.S. Appl. No. 14/600,880.
Maybury, "Distributed, Collaborative, Knowledge Based Air Campaign Planning", NATO/AGARD Lecture Series 200 on Knowledge-Based Functions in Aerospace Mission Systems, 1995, pp. 2-1 to 2-13.

* cited by examiner

| Event # | Timeline Event | Time | Target Objects | Other Object | Hrs To Report | Visibility | Cloud Cover | Spec-trum | Sea State |
|---|---|---|---|---|---|---|---|---|---|
| New Step | | | | | | | | | |
| 0 | Pre-scenario | Day 1 | 1 | 2 | 2 | Day | Partial | Clear | <= 3 ft |
| GO 1 | White Vessel enters AOR | Day 1 | 1 | 2 | 2 | Day | Partial | Clear | <= 3 ft |
| GO 2 | Red Ship 1 leaves port | Day 1 | 1 | 4 | 1 | Day | Partial | Clear | <= 3 ft |
| GO 3 | Red Ship 1 arrives in AOR | Day 2 | 2 | 4 | 1 | Day | Partial | Clear | <= 3 ft |
| 4 | Red Ship 2 leaves port | Day 2 | 2 | 4 | 1 | Night | Partial | Clear | <= 3 ft |
| 5 | Red Ship 2 arrives in AOR | Day 3 | 2 | 4 | 1 | Day | Partial | Clear | <= 3 ft |
| 6 | White Ship 1 arrives in AOR | Day 3 | 2 | 4 | 1 | Day | Partial | Clear | <= 3 ft |

FIG. 3

| Event # New Step | Timeline Event | Desired Intel (What we want to observe) | Comments, Assumptions, & Questions |
|---|---|---|---|
| GO 1 | White Vessel enters AOR | What activity is currently in the AOR? | Threat level - Low<br>1a Only limited ISR assets in AOR at start of scenario.<br>1b White Vessel plan was known ahead of time. |
| GO 2 | Red Ship 1 leaves port | What vessels are in port? What is current activities? | Threat level - Low<br>2a Minimal assets in AOR. AIS monitoring available.<br>2b Non-commercial scans once per day. |
| GO 3 | Red Ship 1 arrives in AOR | When Red vessel arrives in AOR.<br>Current location and activity of White vessel. | Threat level - Low<br>3a Minimal assets in AOR. AIS monitoring available. |

Identifying Intelligence Methods

| Event # New Step | Timeline Event | Desired Intel (What we want to observe) | Comments, Assumptions, & Questions |
|---|---|---|---|
| GO 1 | White Vessel enters AOR | What activity is currently in the AOR? <br> 1.1 Ship / Detect in Port [White - AIS On] | Threat level - Low <br> 1a Only limited ISR assets in AOR at start of scenario. <br> 1b White Vessel plan was known ahead of time. |
| GO 2 | Red Ship 1 leaves port | What vessels are in port? What is current activities? <br> 2.1 Ship / Detect in Port [Red - AIS On] <br> 2.2 Ship / Detect in Port [Red - AIS Off] | Threat level - Low <br> 2a Minimal assets in AOR. AIS monitoring available. <br> 2b Non-commercial scans once per day. |
| GO 3 | Red Ship 1 arrives in AOR | When Red vessel arrives in AOR. <br> Current location and activity of White vessel. <br> 3.1.1 Ship / Detect at Sea [Red - AIS On] <br> 3.1.2 Ship / Detect at Sea [Red - AIS Off] <br> 3.2 Ship / Detect at Sea [White - AIS On] | Threat level - Low <br> 3a Minimal assets in AOR. AIS monitoring available. |

| Intel Methods | | | | | Space | | | | | | Air | | | | |
|---|---|---|---|---|---|---|---|---|---|---|---|---|---|---|---|
| Intel Sources & Means | INT / Sensor | Platform | Max Platforms | Probabilities | Set up | Spc1 Platform Name | Spc2 Platform Name | Spc3 Platform Name | Space Platform 4 | Space Platform 5 | Air1 | Air2 | Air3 | Air Platform 4 | Air Platform 5 | Air Platform 6 |
| Ship / Detect in Port | | | | | | | | | | | | | | | | |
| Fix Fusion Setup | | | | ● | | | | | | | | | | | | |
| Spc 1 COMINT | COMINT | Spc1 | 1 | ● | 1 | X | | | | | | | | | | |
| Spc 1 ELINT | ELINT | Spc1 | 1 | √ | 1 | X | | | | | | | | | | |
| Spc 2 ELINT | ELINT | Spc2 | 2 | √ | 2 | | X | | | | | | | | | |
| Spc 3 FIS | FISINT | Spc3 | 3 | □ | 3 | | | X | | | | | | | | |
| Air3 COMINT | COMINT | Air3 | 1 | √ | | | | | | | 1 | | | | | |
| Air3 ELINT | ELINT | Air3 | 1 | √ | | | | | | | 1 | | X | | | |
| Air3 Radar | Radar | Air3 | 1 | √ | | | | | | | 1 | | X | | | |
| Air1 EO – NIIRS 6.0/6.5 (WAS/Spot) | EO | Air1 | 1 | √ | | | | | | | 1 | X | | | | |
| Air1 IR – NIIRS 5.0/5.5 (WAS/Spot) | IR | Air1 | 1 | √ | | | | | | | 1 | X | | | | |
| Air1 SAR – 1.0/0.3 M Resolution | SAR | Air1 | 1 | √ | | | | | | | 1 | X | | | | |
| Air2 EO – Another example Aircraft | EO | Air2 | 1 | √ | | | | | | | 1 | X | | | | |
| Air2 IR – Another example Aircraft | IR | Air2 | 1 | √ | | | | | | | 1 | X | | | | |
| Air2 SAR – Another example Aircraft | SAR | Air2 | 1 | √ | | | | | | | 1 | X | | | | |
| AIS Data | Proforma | Spc1 | 1 | √ | 1 | X | | | | | | | | | | |

| Means | |
|---|---|
| Platform Id | Sensor Id |
| Air1 | EO - NIIRS 6.0/6.5 (WAS/Spot) |
| Air1 | FMV |
| Air1 | IR - NIIRS 5.0/5.5 (WAS/Spot) |
| Air1 | SAR - 1.0/0.3 M Resolution |
| Air2 | EO - Another example Aircraft |
| Air2 | IR - Another example Aircraft |
| Air2 | SAR - Another example Aircraft |
| Air3 | COMINT |
| Air3 | ELINT |
| Air3 | Radar |
| Spc1 | PROFORMA |
| Spc1 | COMINT |
| Spc1 | ELINT |
| Spc2 | ELINT |

260 — Platform Id
270 — Sensor Id

FIG. 7

Research IRS Methods

| Intel Methods | | | | | | | | Probabilities | | | | | | | | |
|---|---|---|---|---|---|---|---|---|---|---|---|---|---|---|---|---|
| Intel Sources & Means | | | | P_OCC | | | P_SEN_TASK | Visibility | | Cloud Cover | | | P_SEN DET Spectrum | | | Sea State | | P_SEN_CLSFY | P_SEN_LOC |
| | Sensor / INT | Probabilities | Availability | P_OSS R_OSS | R_SEN P_SEN | R_SEN_A V | | Day or P_SEN | Night | Clear | Partial | Over-cast | Clear | Noisy | Jam-med | <=3 | >3 | | |
| Ship / Detect in Port | | | | | | | | | | | | | | | | | | | |
| * Fix Fusion Setup | | • | | | | | | | | | | | | | | | | | |
| * Spc 1 COMINT | COMINT | • | | 2.0 | 1.0 | .9 | | | | | | | .8 | .3 | .1 | | .5 | .7 | .5 |
| * Spc 1 ELINT | ELINT | ✓ | 2013 | 5.0 | .1 | .9 | | | | | | | .75 | .4 | .1 | | | .6 | .6 |
| * Spc 2 ELINT | ELINT | ✓ | | 10.0 | .1 | .7 | | | | | | | .75 | .4 | .1 | | | .6 | .6 |
| * Spc 3 FIS | FISINT | □ | | | | | | | | | | | | | | | | .7 | .6 |
| * Air3 COMINT | COMINT | ✓ | | 2.0 | 1.0 | .8 | | | | | | | .75 | .4 | .1 | | .5 | .8 | .5 |
| * Air3 ELINT | ELINT | ✓ | | 10.0 | .1 | .8 | | | | | | | .75 | .4 | .1 | | | .6 | .6 |
| * Air3 Radar | Radar | ✓ | | 1.0 | .0 | .8 | | | | | | | .9 | .5 | .1 | | | .5 | .9 |
| * Air1 EO – NIIRS 6.0/6.5 (WAS/Spot) | EO | ✓ | | 1.0 | 2.0 | .75 | | .95 | .0 | .95 | .57 | .0 | | | | 1.0 | .5 | .9 | .9 |
| * Air1 IR – NIIRS 5.0/5.5 (WAS/Spot) | IR | ✓ | | 1.0 | 2.0 | .75 | | .95 | .75 | .95 | .75 | .5 | | .5 | | 1.0 | .5 | .7 | .8 |
| * Air1 SAR – 1.0/0.3 M Resolution | SAR | ✓ | | 1.0 | 2.0 | .75 | | .95 | .95 | .95 | .8 | .7 | | | | 1.0 | .5 | .8 | .9 |
| * Air2 EO – Another example Aircraft | EO | ✓ | | 1.0 | 2.0 | .5 | | .95 | .0 | .95 | .57 | .0 | | | | 1.0 | .5 | .9 | .9 |
| * Air2 IR – Another example Aircraft | IR | ✓ | | 1.0 | 2.0 | .5 | | .95 | .75 | .95 | .75 | .5 | | | | 1.0 | .5 | .7 | .8 |
| * Air2 SAR – Another example Aircraft | SAR | ✓ | | 1.0 | .5 | .5 | | .95 | .95 | .95 | .8 | .7 | | | .1 | 1.0 | .5 | .8 | .9 |
| * AIS Data | Proforma | ✓ | | 4.0 | .5 | .99 | | | | | | | .95 | .4 | | | | .95 | .95 |

FIG. 8

PROCESS OF PROBABILISTIC MULTI-SOURCE MULTI-INT FUSION BENEFIT ANALYSIS

RELATED APPLICATIONS

This application claims the benefit of U.S. Provisional Application No. 61/929,250 filed Jan. 20, 2014, which is hereby incorporated herein by reference.

Also, this application is related to two commonly-assigned concurrently-filed applications, U.S. application Ser. No. 14/600,880 entitled "Integrated Digital Weapons Factory and Digital Operations Center for Producing, Deploying, Assessing, and Managing Digital Defects" now issued as U.S. Pat. No. 9,544,326), which is hereby incorporated herein by reference in its entirety; and U.S. application Ser. No. 14/600,920 entitled "System and Method for Asymmetric Missile Defense" now issued as U.S. Pat. No. 9,726,460), which is hereby incorporated herein by reference in its entirety.

BACKGROUND

Sensor platforms may include a plurality of sensors to detect various objects or events in a local or wide geographic area. For example, a drone flying over a land mass may be equipped with an infrared sensor and a camera to detect objects that are visible, as well as heat signatures of objects that may be covered. The drone may provide the detections to a command station that can analyze the information and determine a course of action.

Presently, multiple sensor platforms may be utilized at any given moment, but the range and availability of these platforms is limited. The limited range and availability of the sensors prevents detection of some objects or events that would otherwise be desirable to observe, and can lead to providing incomplete information to a war fighter, as well as providing information at a time that is too late for the war fighter to act on.

SUMMARY OF INVENTION

The present invention provides a method of fusing sensor detection probabilities. The fusing of detection probabilities may allow a first force to detect an imminent threat from a second force, with enough time to counter the threat. The detection probabilities may include accuracy probability of one or more sensors and an available time probability of the one or more sensors. The detection probabilities allow a determination of accuracy of intelligence gathered by each of the sensors. Also, the detection probabilities allow a determination of a probable benefit of an additional platform, sensor, or processing method.

The detection probabilities allow a system or mission analyst to quickly decompose a problem space and build a detailed analysis of a scenario under different conditions including technology and environmental factors. The detection probabilities may include a probability of detecting, locating, and/or tracking an object, and allow a determination of a current effectiveness and/or allow a determination of an expected effectiveness of additional and/or fewer resources.

Knowing an expected effectiveness of additional resources, such as an additional platform, sensor, and/or processing method, supports automated decision aides and may allow a determination to deploy such resource based on the expected effectiveness or benefit of meeting a threshold level. Similarly, knowing an expected effectiveness of fewer resources, such as a removed platform, sensor, and/or processing method, supports automated decision aides and may allow a determination to remove such resource based on the expected effectiveness or loss. The automated decision aides may include a computer-based information system that supports decision making activities based on an assessed effectiveness.

Assessing effectiveness based on adding or removing a resource allows determination of a most effective combination of resources to monitor a single object or multiple objects across various locations and time. Models demonstrating benefits of fusing data from multiple data types and platforms may be created to demonstrate such effectiveness. The effectiveness may be determined by fusing (e.g., integrating) multi-source and/or multi-INT products for a plurality of platforms, sensors, and/or target objects. Also, the determination of effectiveness may be platform, sensor, or intelligence independent, and may incorporate intelligence level parameters to provide an effectiveness that is tailored for a specific object, platform, sensor, environmental condition, and/or timeline scenario.

Also, the method of fusing sensor detection probabilities may allow a determination of statistical intelligence surveillance and reconnaissance (ISR) capabilities, effectiveness, gaps, as well as analysis of effects of adding or removing capabilities, a technology, and/or tactic.

Additionally, the method of fusing sensor detection probabilities may allow a determination of a minimum threshold of a performance parameter for new systems to provide a requisite benefit to resulting intelligence surveillance and reconnaissance products and/or situational awareness.

The method of fusing sensor detection probabilities may be automated and performed by a computer system, for example a computer in data communication with a plurality of platforms and corresponding sensors. Alternatively, a system of computers and computer networks may communicate between one another to repeatedly perform portions of the method. In an embodiment, a computer or computer network directs a platform or sensor to a location and/or determines a target for the platform and/or sensor to focus on.

An aspect of the invention determines an effectiveness of a sensor platform.

Another aspect of the invention determines a location of a target, based on a determination of effectiveness of detection of the target object.

Yet another aspect of the invention determines an intent of a target object, based on a determination of one or more locations of the target object. The determination of intent may include a determination of a damage capability of the target object.

According to one aspect of the invention, a method of determining sensor detection probabilities of a system of platforms each having one or more respective sensors, the method comprising determining a set of detection parameters of one or more combinations of platforms and respective sensors of the system of platforms based on a target object, environmental conditions affecting detection of the target object during a first point in time of a timeline of the target object, and capabilities of each of the one or more combinations, deriving a time limit to detect the target object, the time limit being at a second point in time after the first point in time, and based on a threat level of the target object, updating the set of detection parameters based on the second point in time, deriving a time to process a detection of the target object by each of the one or more combinations, deriving an accuracy of the of each of the one or more combinations based on the target object, environmental conditions affecting detection of the target object during the first point in time, and capabilities of each of the one or more combinations, and determining sensor detection probabilities of each sensor of the one or more combinations based on the second point in time, the time to process the detection of the target object, and the accuracy of each of the one or more combinations. Any of the above aspects may include any of the below features individually or in combination.

The method of determining sensor detection probabilities may further comprise determining that one or more additional combinations of platforms and/or respective sensors should be added to a region based on the sensor detection probabilities.

The method of determining sensor detection probabilities may further comprise relocating the one or more additional combinations to detect the target object.

The method of determining sensor detection probabilities may further comprise deriving a time for detection of the target object based on a derived number of detections of each intelligence type of the one or more combinations and a plurality of other combinations, and/or based on a derived time to report result of each intelligence type of the one or more combinations and the plurality of other combinations.

The method of determining sensor detection probabilities may further comprise deriving a quality of detection based on a derived number of detections of each intelligence type of the one or more combinations and a plurality of other combinations, and/or based on a derived quality of an intelligence product of each intelligence type of the one or more combinations and the plurality of other combinations.

The capabilities of each of the one or more combinations may be based on historical data of the one or more combinations and subject matter expert data related to the one or more combinations.

The method of determining sensor detection probabilities may further comprise a method of fixing one or more locations of the target object based on the sensor detection probabilities, and/or a method of tracking based on the sensor detection probabilities and the one or more locations of the target object.

A computer network including a plurality of computers in electronic communication with one another, wherein at least one of the plurality of computers performs each step of the method of determining sensor detection probabilities, and wherein the computer network may be in electronic communication with the system of platforms and may instruct the system of platforms to add at least one additional combination of a platform and a sensor of the system of platforms to a region, and wherein the system of platforms may relocate the at least one additional combination to the region.

The method of determining sensor detection probabilities may further comprise determining a probability of one or more of the platforms and the respective sensors will be available to detect an enemy observable based on a weighted average time.

The method of determining sensor detection probabilities may further comprise determining whether one or more additional platforms and respective sensors of the system of platforms would have a higher probability of detecting the target object based on the time to process the detection of the target object, and/or an accuracy of each of the additional platforms and respective sensors.

Determining whether the one or more additional platforms and respective sensors would have a higher probability of detecting the target object may be further based on an intelligence method associated with the target object.

Determining whether the one or more additional platforms and respective sensors would have a higher probability of detecting the target object may be further based on fusion parameters of the one or more additional platforms and respective sensors, and/or based on fusion parameters of the one or more combinations.

The fusion parameters may include manual fusion parameters.

The fusion parameters may include automatic fusion parameters.

The fusion parameters may include a combination of manual and automatic fusion parameters.

The method of determining sensor detection probabilities may further comprise deriving a probability of detection of the target object based on the target object and/or an intelligence type of the one or more combinations.

Deriving a probability may be further based on a plurality of target objects, an intelligence type of the one or more combinations, a plurality of other combinations of platforms and sensors of the system of platforms, and/or based on quality metric.

The target object may include a plurality of enemy vehicles.

The target object may include a plurality of enemy weapons.

One or more of the plurality of enemy weapons may be a missile.

A plurality of the one or more combinations may be relocated from a low threat level area to a high threat level area based on physical conditions including weather, temperature, time, and/or environment.

According to another aspect of the invention, a method of determining sensor detection probabilities of a system of platforms each having one or more respective sensors, the method comprising identifying intelligence methods of a plurality of combinations of platforms and respective sensors of the system of platforms based on a plurality of target objects, deriving probability parameters of each of the plurality of combinations, mapping accuracy and timeliness parameters of each of the plurality of combinations to the probability parameters, integrating fusion parameters of each of the plurality of combinations with the probability parameters, the accuracy parameters, and the timeliness parameters, deriving a probability for each of the plurality of combinations detecting each target object of the plurality of target objects based on the integrated fusion parameters, deriving tipped probabilities based on the probabilities of each of the plurality of combinations detecting each target object. The above aspect may include any of the above features individually or in combination.

The foregoing and other features of the invention are hereinafter described in greater detail with reference to the accompanying drawings.

BRIEF DESCRIPTION OF THE DRAWINGS

FIG. 3 is an exemplary timeline of events of FIG. 2.

FIG. 4 is an exemplary association of each event of FIG. 3 with desired intelligence and/or comments, assumptions and/or questions.

FIG. 5 is a schematic representation of identifying intelligence methods of the method of FIG. 2, including an exemplary identification of intelligence methods including mapping of the identified intelligence methods to a target object during each event of FIG. 3.

FIG. 6 is an exemplary mapping of platform and/or sensor capabilities to an intelligence method of the intelligence methods of FIG. 3.

FIG. 7 is an exemplary automatic association of a plurality of exemplar sensors to a corresponding platform.

FIG. 8 is a schematic representation of researching ISR methods of the method of FIG. 2, including an exemplary association of platform-specific detection parameters for exemplary environmental conditions.

DETAILED DESCRIPTION

The principles of this present application have particular application to determining probabilities related to detection of target objects, such as enemy vehicles and/or events, with platforms equipped with sensors, such as vehicles equipped with sensors, and thus will be described below chiefly in this context. It will of course be appreciated, and also understood, that principles of this invention may be applicable to other target objects, such as people, structures, geographic regions, and/or natural phenomena, and to other platforms and sensors.

Figure 1:
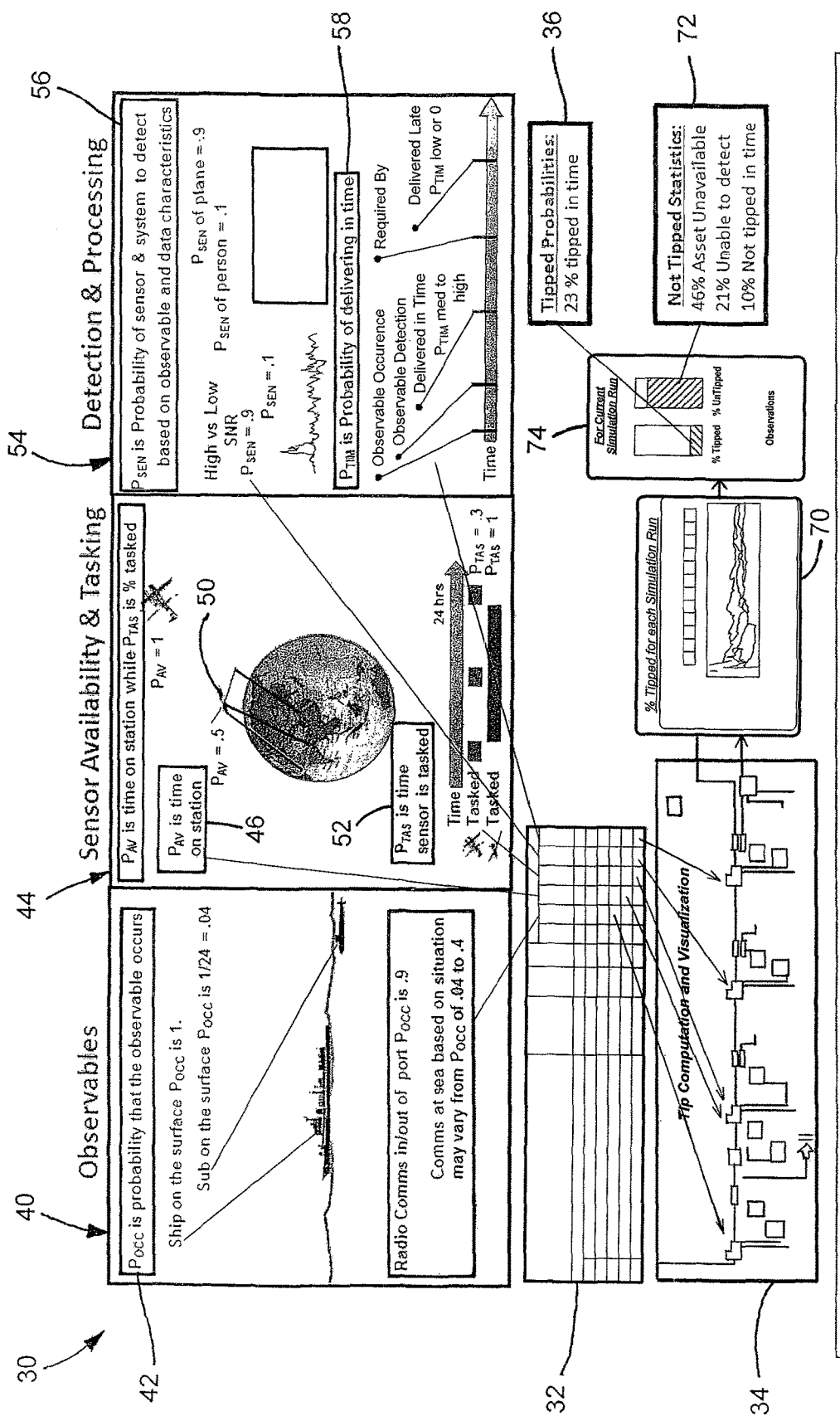
FIG. 1 is an exemplary mapping of probabilities to an intelligence method and inputting the probabilities into an exemplary Monte Carlo simulation system to determine a probability of a successful intelligence surveillance and reconnaissance tip and/or cue.

FIG. 1 is an exemplary mapping of probabilities 30 to an intelligence method 32 and inputting the probabilities into an exemplary Monte Carlo simulation system 34 to determine a probability of a successful intelligence surveillance and reconnaissance (ISR) tip probability 36 (e.g., tip and/or cue). The probabilities may be adjusted based on a timeline of scenario events, for example an observables module 40 may determine a probability that an observable occurs ($P_{OCC}$) 42 may change from 0.04 to 0.4 (i.e., 4%-40%) based on surrounding conditions, such a ship communicating at sea. The $P_{OCC}$ 42 may be mapped to the intelligence method 32.

A sensor availability and tasking module 44 may determine a probability of time on station ($P_{AV}$) 46 and/or a probability of time a sensor platform 50 (e.g., an aircraft) is tasked ($P_{TAS}$) 52 (e.g., a percentage of time each day spent covering a region of the earth).

A detection and processing module 54 may determine a probability of sensor and system to detect based on observable and data characteristics ($P_{SEN}$) 56 and/or a probability of delivering on time ($P_{TIM}$).

Each of the probabilities 42, 46, 52, 56, 58 may be mapped to the intelligence method 32 and then input into the Monte Carlo simulation system 34, which may determine a percentage of successful tips over time for each simulation run 70. The probability of tipping (e.g., successful ISR tips/cues) and a probability of not tipping 72 (e.g., unsuccessful ISR tips/cues) may be based on a current simulation run 74.

Figure 2:
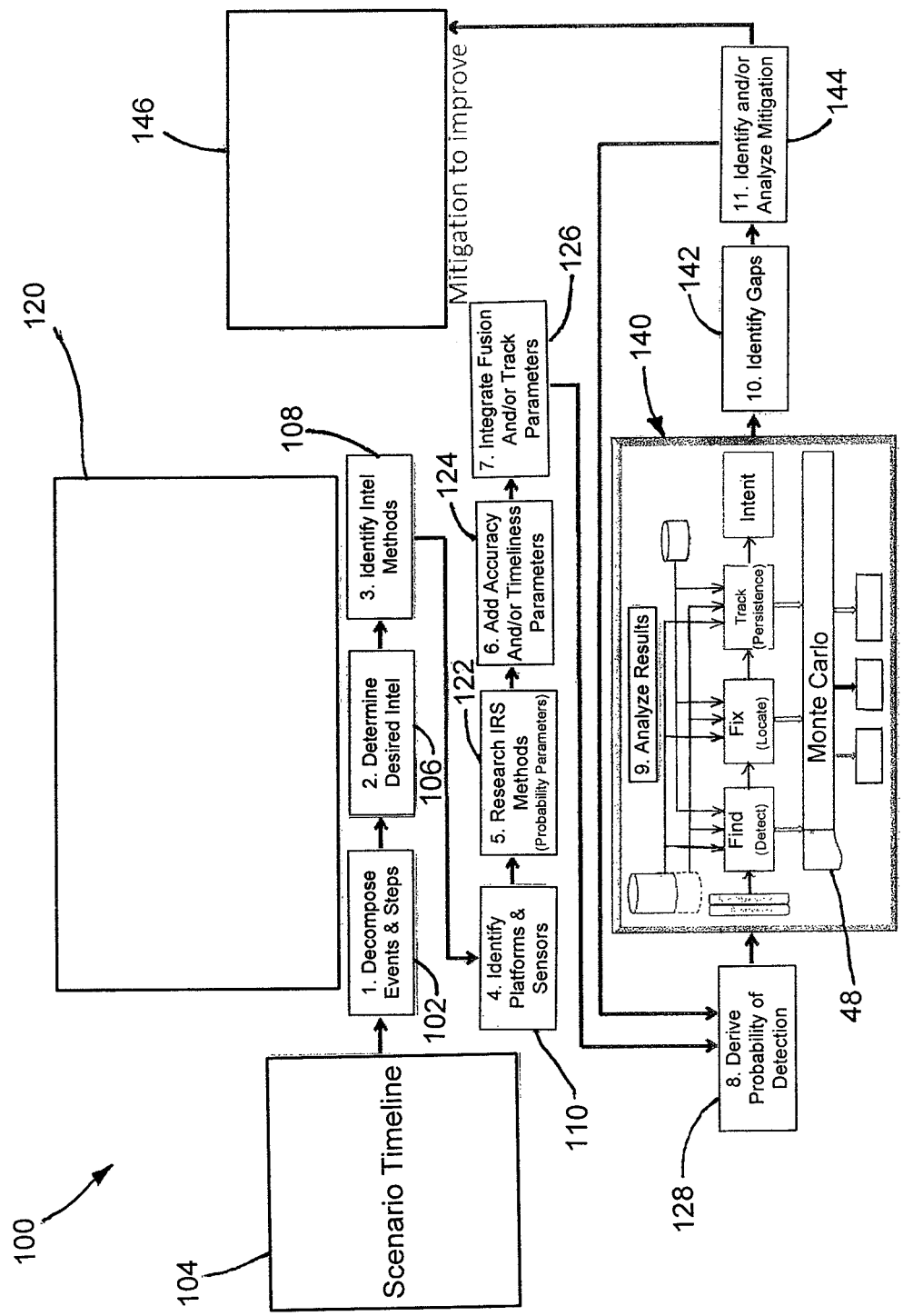
FIG. 2 is a flow chart of an exemplary method of improving detection probabilities.

FIG. 2 is a flow chart of an exemplary method of improving detection probabilities 100. The method of improving detection probabilities may include decomposing events and steps 102 of a timeline of events 104, determining desired intelligence 106, identifying intelligence methods 108, identifying platforms and sensors 110 from a plurality of platforms and sensors 120, researching ISR methods 122, incorporating accuracy and/or timeliness parameters 124, integrating fusion and/or track parameters 126, deriving a probability of detection 128, analyzing the probability of detection 140, identifying gaps 142, identifying and/or analyzing a mitigation 144, and/or mitigating one or more identified gaps 146. Each of the above steps, and an interrelation between them, is explained below in greater detail.

FIG. 3 is an exemplary timeline of events 104 of FIG. 2 that may be decomposed 102 into smaller steps. Each timeline event 200 and target object 202 may be determined and input into the timeline of events 104. Each timeline event may comprise activities related to one or more forces (e.g., Red, Blue, and/or other). Sub-events may relate to a single force (e.g., Blue) to more clearly separate multi-force capabilities. Alternatively, an appropriate mix of forces may be chosen to support further analysis. At a later time, a given event may be sub-divided into smaller increments to facilitate analysis. Additional timeline events and/or target objects may also be added at a later time.

FIG. 4 is an exemplary association of each event 200 of FIG. 3 with desired intelligence 210 and/or comments, assumptions, and/or questions 212 to determine desired intelligence 106. The determination of desired intelligence 106 may include determining a required intelligence for a given scenario. For example, an intelligence device that can sense objects below a surface of water may be required if the target object 108 is a sub-sea vehicle. A definition of a desired intelligence 210 for each timeline event 200 may be provided. For example, a definition of objects and/or activities that may to be detected and what is desired to learn about the objects and/or activities may be input into the comments, assumptions, and/or questions 212. In an embodiment, assumptions, constraints, and/or questions related to each timeline event 200 may be included in the comments, assumptions, and questions 212.

FIG. 5 is a schematic representation of identifying intelligence methods 108, including an exemplary mapping of identified intelligence methods 240 to one or more of the target objects 202 during each timeline event 200. One or more of the intelligence methods 240 may be identified 108 (FIG. 2) by researching platform, sensor, and/or system capabilities, as shown at reference number 108 in both FIG. 2 and FIG. 5. Identifying intelligence methods 108 may include data provided by subject matter experts (SME) to identify and document available technologies. An individual entry into a database may be made by an SME for each identified intelligence and associated platform and corresponding sensor.

For example, multiple entries may be made for the same capability as it applies to different release levels of a given sensor, or different entries for the same sensor on different platforms, or for the same intelligence such as communications signals intelligence (COMINT), but for different signal types. The level of detail may include minimal information to save on resources, or may include an extensive amount of information to improve results. In general, greater detail allows for a higher level of fidelity.

Once an intelligence method 240 is identified, the method may be mapped to a timeline event 200 that corresponds with the intelligence method 240. For example, the intelligence method 240 may be detecting a ship in port for the timeline event 200 to detect the target object 202 (e.g., a vessel, of a white force, entering or approaching an area of responsibility (AOR) that the white force is responsible for protecting or observing). Once the intelligence methods 240 are determined, for example researched, collected, and documented, data identifying the intelligence methods 240 may be stored and used again for additional analysis without expending resources recollecting the data. In an embodiment, a computer system stores the data identifying intelligence methods to repeatedly provide the intelligence methods for subsequent analysis.

For example, the computer system may include a processor unit and a storage unit configured to perform one or more portions of one or more of the steps identified in the method of FIG. 2. In an embodiment, one or more of the sensor platforms 50, for example an aircraft (as shown in FIG. 1, above) may include a computer or a processor unit configured to communicate with the computer performing one or more portions of the method of FIG. 2. In another embodiment, the computer performing the one or more portions of the method of FIG. 2 is a plurality of computers in communication with one another through an electronic communication link, such as a global system of interconnected computer networks.

The intelligence methods 240 may be periodically revisited to confirm validity and/or to address the inclusion of new technologies. For example, a computer system may re-perform the method of FIG. 2 every day. In another embodiment, a computer system may re-perform the method of FIG. 2 periodically within a month, a week, a day, an hour, a minute, and/or a second of a last performance of the method. Periodic repetition of the intelligence methods 240 may be based on requirements for a current mission.

FIG. 6 is an exemplary mapping of capabilities 250 corresponding to platforms 260 and/or sensor 270 associated with the intelligence method 240. A maximum number of platforms available 272, probabilities 274, and/or type of platform 276 may be included in the capabilities 250.

Defining which intelligence platforms 260 and/or sensors 270 may be effective to contribute to detection probabilities allows a determination of whether a given platform 260 may be included for analysis. Determination of whether a platform 260 may be effective may be based on the intelligence method 240 and/or the target object 202 (FIG. 5). For example, a sensor producing a National Imagery Interpretability Rating Scale (NIIRS) image of a level 4 may be sufficient to support detecting airstrips or ships but it may not be sufficient to detect personnel servicing aircraft at an airstrip.

FIG. 7 is an exemplary automatic association of a plurality of exemplary sensors 270 to a corresponding platform 260. For example, a computer processor may match a platform 260 identification with a sensor 270 identification, based on a definition of the platform 260 that corresponds with a definition of the sensor 270. The computer processor may perform the matching in near-real-time, thereby allowing resulting matches to be available in near-real-time. In an alternative embodiment, observation methods (e.g., platforms and/or sensors) are manually associated with desired intelligence and/or desired information.

FIG. 8 is a schematic representation of researching ISR methods 122, including an exemplary association of specific detection parameters 300 of the platform 260 for exemplary environmental conditions 302. Researching ISR methods 122 may determine probabilities 274 associated with each identified platform 260 and sensor 270 pairing. The probabilities 274 may be determined for each intelligence method 240 and/or repeated over time to verify accurate probabilities are utilized. For example, an intelligence method 240 of detecting a ship in port may have a probability of sensor to sense or detect this observable including associated processing ($P_{SEN\_DET}$) 304 based on visibility 306, cloud cover 308, spectrum 310, and/or sea state 312. If a technology is not yet available, a notation may be made of an expected availability 278. Parameters for the new technology may be based on SME data that considers combinations of other technologies with similar characteristics.

Each detection parameter 300 may be based on the intelligence method 240 and/or the target object 202 (shown in FIG. 5). For example, the parameters 300 given for one of the platforms 260 (e.g., Spc1) in combination with one of the sensors 270 (e.g., COMINT) for the intelligence method 240 of detecting a ship in port may be entirely different for a different platform 260 and sensor 270 combination, or different for detecting a tank at a landmark instead of the ship at port. In an embodiment, a computer processor may determine detection parameters in near-real-time, which allows results to be provided during a useful period of time. For example, a measure of performance (MOP) may be 90% for detecting a ship entering a port if the detection parameters can be provided within an hour, but the MOP may be 0% if the detection parameters cannot be provided for another 12 hours. If the processing time required is expected to be 12 hours, the MOP being 0% may prevent any processing of the detection parameters to be performed. If the processing time required is expected to be less than an hour, the MOP being 90% may allow processing of the detection parameters to be performed.

In another embodiment, decreased processing time, for example processing of the detection parameters by an automated computer processor, allows additional platform and detection parameters to be considered in a requisite time period.

Figure 9:
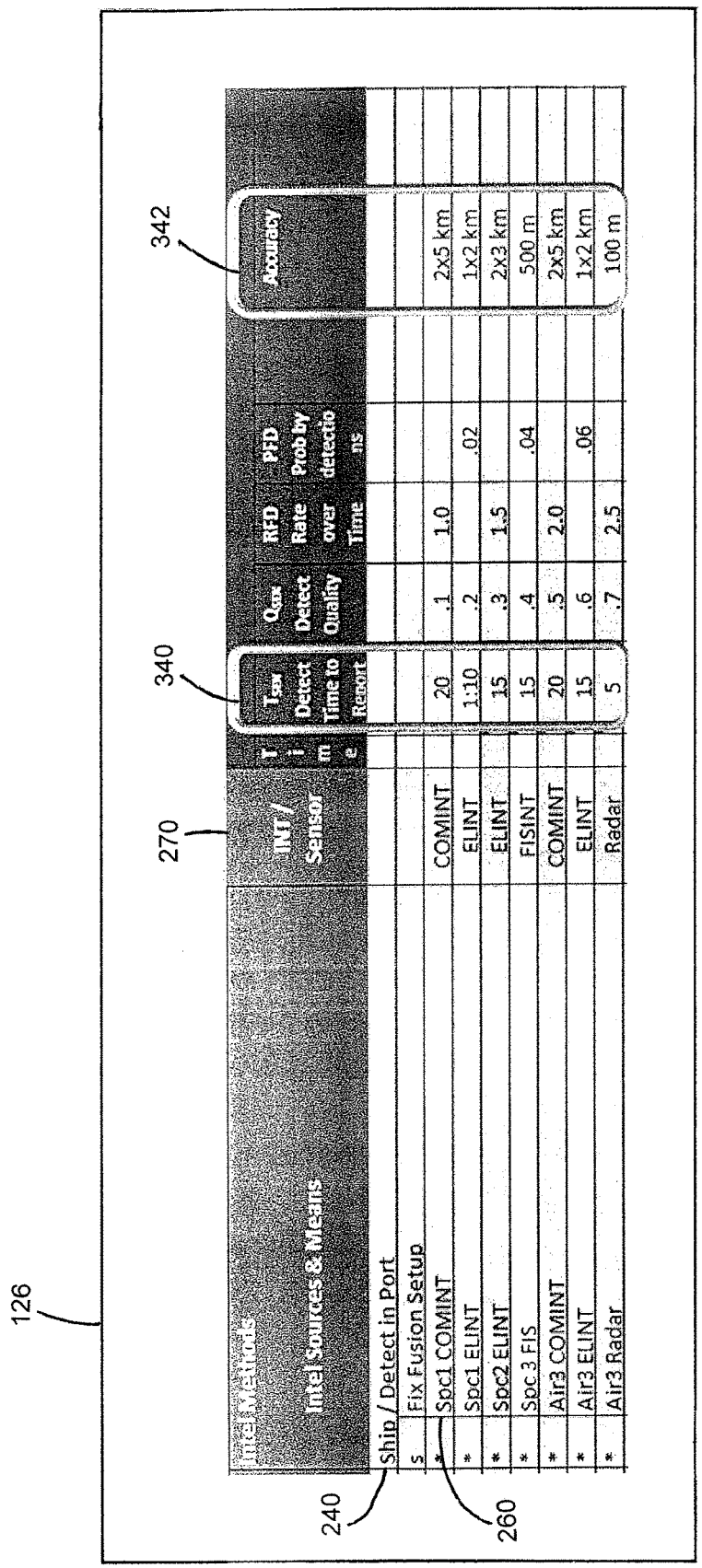
FIG. 9 is a schematic representation of adding accuracy and/or timeliness parameters, including an exemplary mapping of a plurality of sensors of FIG. 6 with time to process and report, and with an average accuracy range of each sensor.

FIG. 9 is a schematic representation of adding accuracy and/or timeliness parameters 126, including an exemplary mapping of the sensors 270 with a time to process and/or report a detection ($T_{SEN}$) 340, and with an average accuracy range 342 of each sensor 270. A probability that a platform 260 and sensor 270 combination will be available before a desired and/or requisite point in time ($P_{TIM}$) may be based on a time for the sensor 270 and $T_{SEN}$ 340.

For example, one of the platform 260 and sensor 270 combinations (e.g., Spc1 COMINT) may have a $T_{SEN}$ 340 of 20 hours. The resulting $P_{TIM}$ may be 1 during a low threat scenario. Alternatively, the $P_{TIM}$ may be 0 if $T_{SEN}$ is 1 hour, such as when a report is necessary within 1 hour to be relevant, for example during a high threat situation. Thus, decreasing $T_{SEN}$, for example during a real-time threat situation, may preclude use of multiple platform 260 and sensor 270 combinations. As mentioned above regarding required processing time and MOP, automated computer processing may reduce the time required to process and report detections from each combination to allow consideration of combinations that would otherwise take too much time to process and report.

Figure 10:
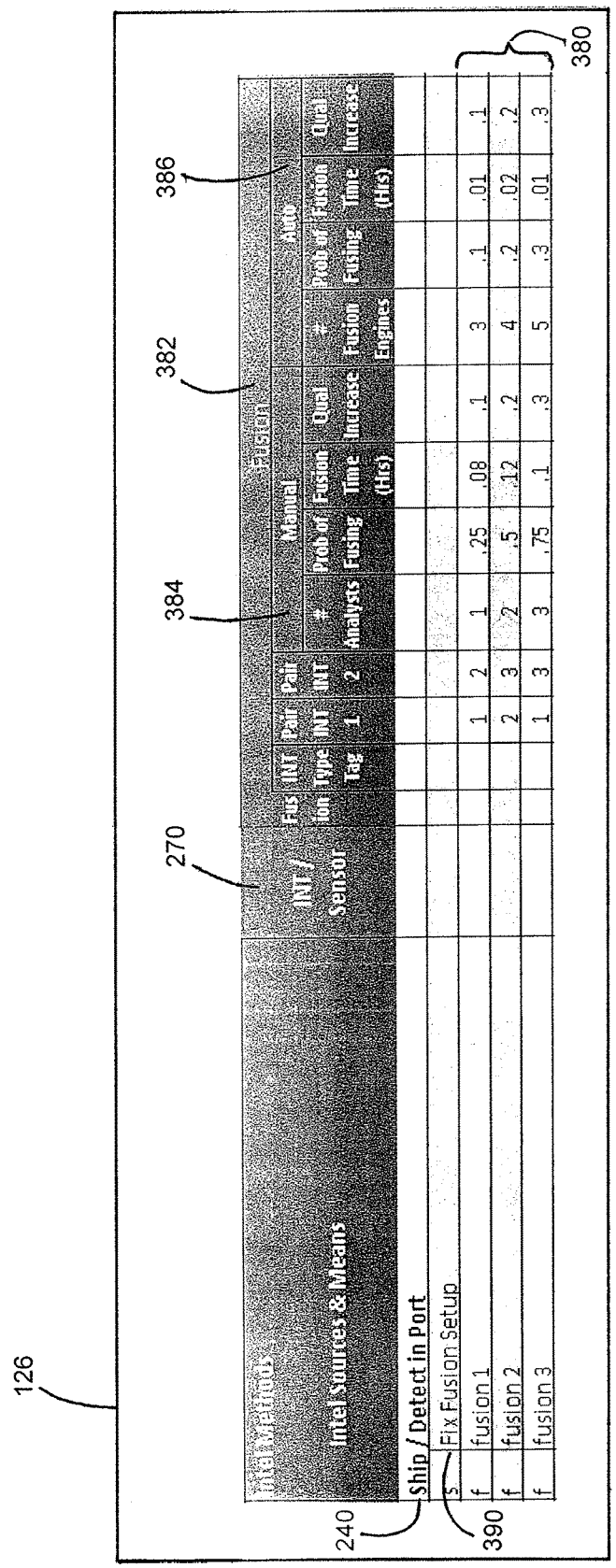
FIG. 10 is a schematic representation of integrating fusion and/or track parameters, including an exemplary fusion parameters for an exemplary pairing of intelligence.

FIG. 10 is a schematic representation of integrating fusion and/or track parameters 126, including exemplary fusion parameters 380 for an exemplary pairing of intelligence. For example, the fusion parameters may for a fix fusion 390, which will be explained in more detail below regarding FIG. 20. In an embodiment, the parameters are track parameters.

The fusion and/or track parameters may define a fusion performance 382 of manual fusion (e.g., performed by analysts) 384 and/or or automated fusion (e.g., performed by a computer) 386. Including performance of the manual fusion 384 and the automated fusion 386 allows comparison of the two, which allows a determination of costs and benefits between using one over the other.

The manual fusion 384 and automated fusion 386 information allows analysis of the benefits of cross-intelligence data association and fusion as well as analysis of the differences between manual and automated processing.

The fusion parameters 380 allow for the unique definition of a probability of and/or resulting benefit of different intelligence products to fuse with other products. For example, two sensors 270. A determination of a resulting change in product quality and/or time to fuse and/or report may be determined based on the fusion parameters 380.

Figure 11:
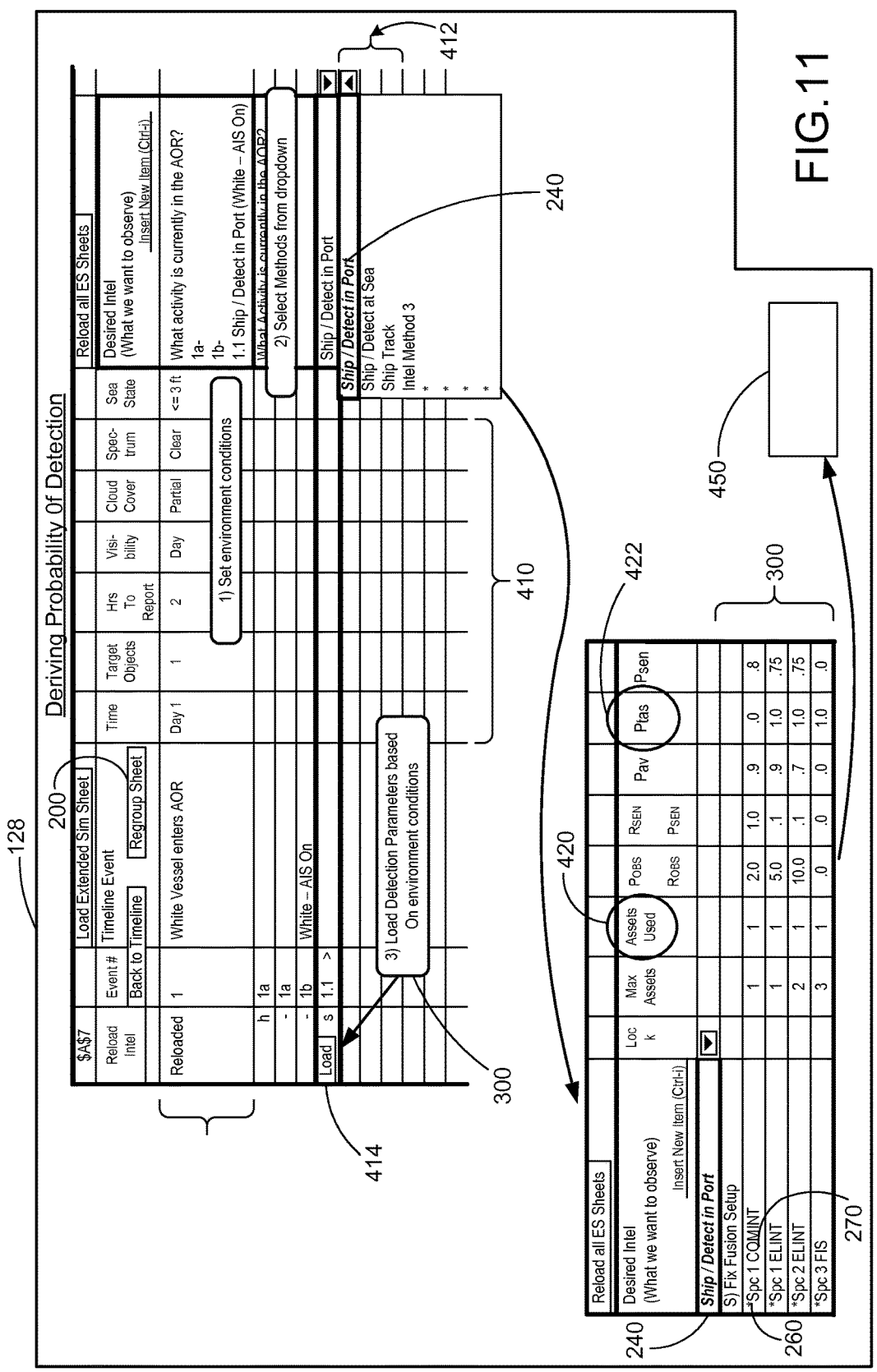
FIG. 11 is a schematic representation of deriving the probability of detection, including an exemplary set of environmental conditions, method of selecting intelligence methods, loading of corresponding detection parameters of FIG. 8, and a probability of tasking and availability of FIG. 6.
Figure 12:
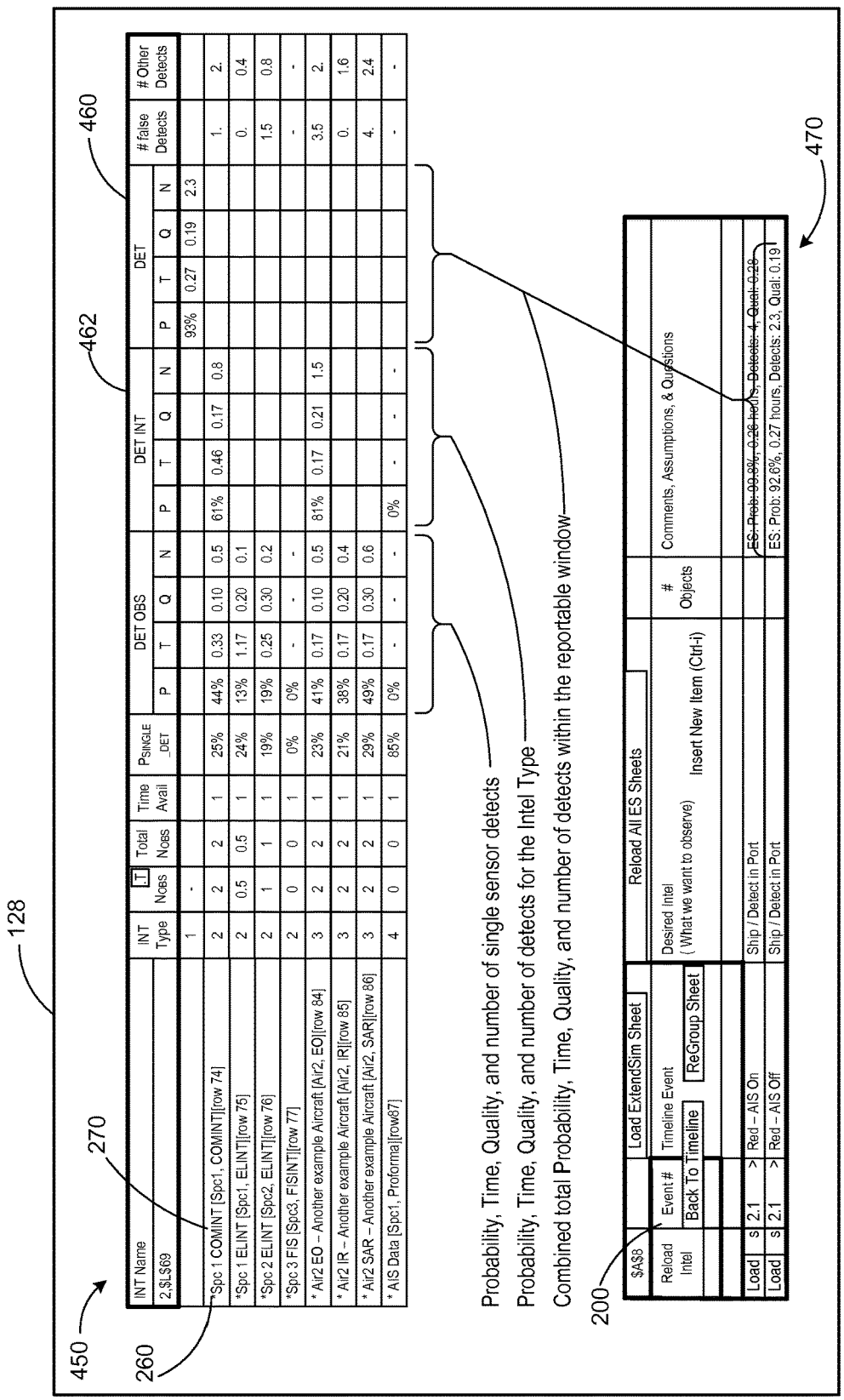
FIG. 12 is the schematic representation of deriving the probability of detection, including an exemplary mapping of a best case probability for a plurality of associated platforms and sensors of FIG. 6.

FIG. 11 is a schematic representation of deriving the probability of detection 128, including an exemplary set of environmental conditions 410, a method of selecting intelligence methods 412, loading 414 of the corresponding detection parameters 300 (shown in FIG. 8), an exemplary display of parameters 300, and a schematic of an exemplary mapping 450 (shown in FIG. 12).

Probabilities of detecting or providing the desired and/or required intelligence for each step of each timeline event 200 may be derived. A software program running on a computer may generate a set of intelligence methods 412, from which the intelligence method 240 may be selected. Once the intelligence method 240 is selected, the associated detection parameters 300 are transferred into the timeline event 200 based on the environmental conditions 410 and timeliness desires and/or parameters based on the timeline event 240. Timeliness desires and/or parameters for a given mission may be based on requirements of the mission for timeliness and for available platforms (e.g., vehicles with sensors) for parameters.

A simulation modeling program 48, such as ExtendSim illustrated schematically in FIG. 2, may run an simulation model based on the fusion parameters 380 to compute a high confidence value adjusting the defined parameters based on a confidence of each input parameter. For example, the confidence of each input parameter may be a standard deviation of each input parameter. ExtendSim is a commercially available tool that is utilized to model the find component 500, fix component 502, and track component 504 to apply user defined probability distributions to input parameters and using Monte Carlo runs to calculate the statistical results.

Figure 14:
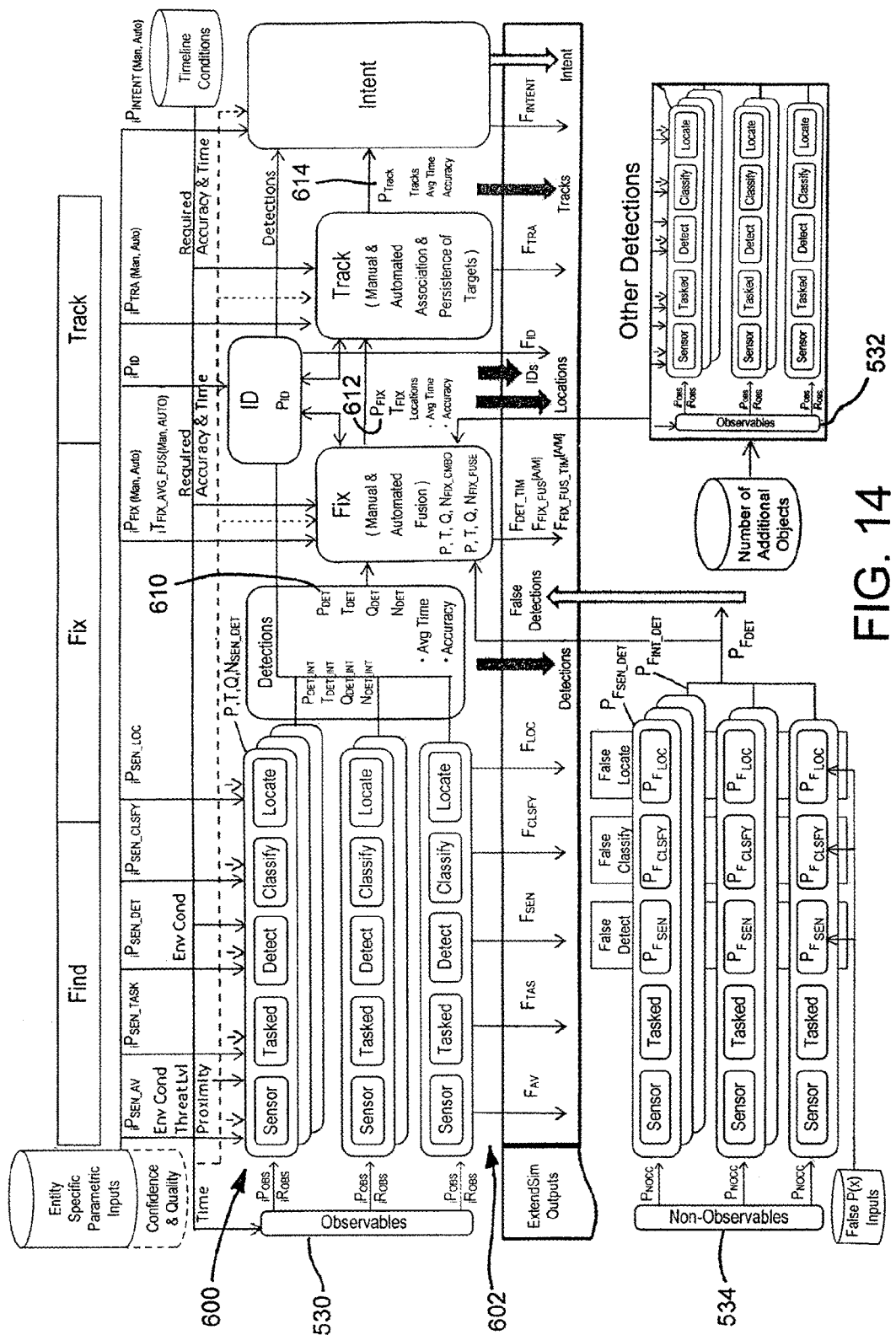
FIG. 14 is a detailed flow chart of the methods of FIG. 13.

The simulation modeling program 48 outputs may provide the tipped probabilities 36, and failure statistics 510. The success tipped probabilities may provide the calculated probability of detecting, fixing, and tracking the object. The failure statistics 510 may provide a count of each observation or fusion attempt failure that occurs throughout the entire analysis. The failure statistics 510 may identify key areas for potential improvement. Multiple inputs to the failure statistics 510 are illustrated in FIG. 14, described below.

The simulation modeling program 48 model may execute a set of Monte Carlo simulation system 34 (FIG. 2) runs varying the data, based on the level of confidence associated with each intelligence product and the fusion probabilities 380. The Monte Carlo approach may account for variations in the input parameters as well as unpredictable variations in the processing and/or environmental parameters.

Still referring to FIG. 11, once the detection parameters 300 are loaded, a number of platform 260 and sensor 270 combinations used 420 (e.g., 1 Spc1 COMINT) may be determined and/or a probability of time tasked ($P_{TAS}$) may be determined (e.g., 0). A probability of availability ($P_{AV}$) may determine whether a platform 260 and sensor 270 combination may be added. For example, a platform 260 may be in an area of interest, but not tasked to examine a specific area of interest at a particular time.

The detection parameters 300 may be determined for each intelligence product, intelligence method 240, for combined results of each target object 202 (FIG. 3) and/or desired information.

FIG. 12 is the schematic representation of deriving the probability of detection 128, including an exemplary mapping of a best case probability 450 for a plurality of associated platforms 260 and sensors 270 combinations. The best case probability 450 may be determined without running a Monte Carlo analysis.

The mapping of the best case probability 450 may include detection probabilities (DET) 460. The DET 460 may be based on detection probabilities for a given intelligence ($DET_{INT}$) 462 (e.g., a platform 260 and sensor 270 combination) and/or detection probabilities for a given observable ($DET_{OBS}$) 464 (e.g., target object 202 shown in FIG. 3)

The DET 460 may be mapped to each event 200 to provide a simple listing of probabilities 470 for each event 200.

Figure 13:
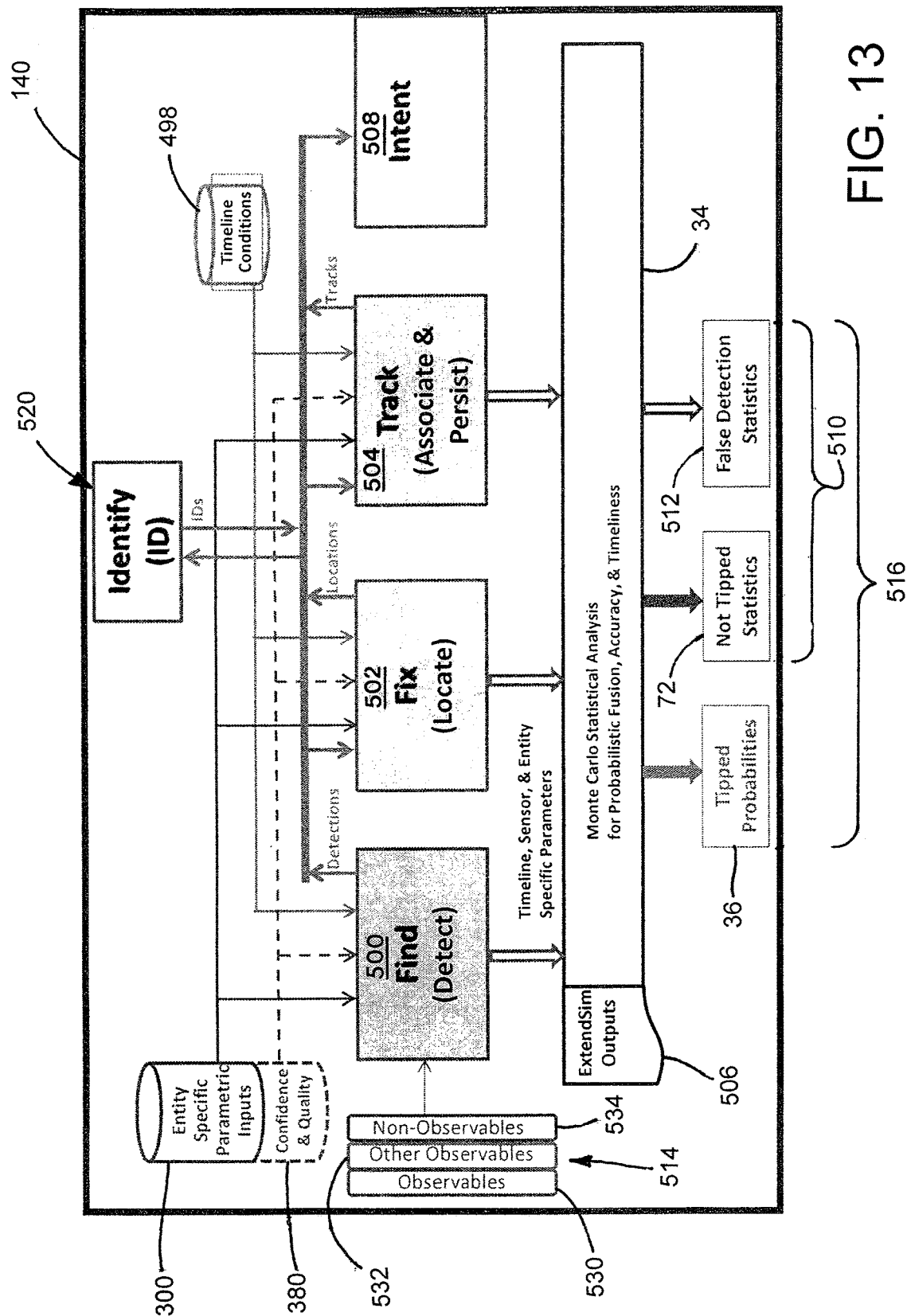
FIG. 13 is a schematic representation of analyzing results, including a flow chart of an exemplary method of finding, an exemplary method of fixing, and an exemplary method of tracking the target object of FIG. 5.

FIG. 13 is a schematic representation of analyzing results 140 (e.g., an intelligence value metric calculus), including a flow chart of a method of finding 500, a method of fixing 502, and a method of tracking 504 the target object 202 (shown in FIG. 5). Results from the above analysis may be inputs for one or more of the finding 500, fixing 502, and/or tracking 504. For example, the results from above may be reviewed and/or summarized. Missing or erroneous data may be reviewed and/or corrected prior to finalizing results. In an embodiment, an automated computer processor may review and or correct the missing or erroneous data. In another embodiment, a probability of correctness is determined based on the missing or erroneous data.

Particularly, the parametric inputs 300, fusion parameters 380, timeline conditions 498 (e.g., environmental conditions 302), and observable information 514 (e.g., target object 202) may provide inputs for the finding 500, fixing 502, and/or tracking 504 to feed into the Monte Carlo simulation system 34. The Monte Carlo simulation system 34 may incorporate data from the finding 500, fixing 502, tracking 504, and/or an ExtendSim simulation 506 to provide tipped statistics 516 (e.g., tipped probabilities 36, not tipped probabilities 72, and/or false detection statistics 512).

Determination of the tipped statistics 516 may be accomplished through analyzing the probability of detecting various observables 514 (e.g., observables 530, other observables 532, and non-observables 532) associated with the target object and/or objects 202 under analysis. The observables 530 may be the observables associated with the specific target object 202 under analysis. To detect the target object 202, it may have one or more observables 530 associated with it. For example, to detect a ship, the observables 530 may be the ship on the surface of the water and signals intelligence radio-frequency (SIGINT RF) transmissions. The ship may be detectable by images or radar, whereas the transmissions may be detectable by an automatic identification system (AIS), COMINT, or electronic signals intelligence ("ELINT"). The other observables 532 may be the observables 514 associated with other objects that are in the area of analysis, but are not the target object 202. An "other object" may be any object that generates observables 514 that are not associated with the targeted object 202, but are generated within the window of analysis and will create either increased or possible conflicting observations. The non-observables 534 may be falsely detected observations that are either incorrectly detected or incorrectly associated with the target object 202.

The find analysis 500, fix analysis 502, and track analysis 504 form a central part of the analysis 140, which may also include an intent analysis 508. Any provided probabilities, along with an integration of one or more multi-source multi-intelligence detections and/or locations, may be combined determining an intent of the target object 202. The intent analysis 508 may be a prediction of the intent of the target. The prediction may be based on results from the track analysis 504. For example, the track analysis 504 may determine that an enemy plane has travelled 400 miles in a direction of a location A (e.g., a friendly military base). The intent analysis 508 may determine that location A is an intended destination of the enemy plane based on the previous path of the enemy plane. In an embodiment, the intent analysis may determine that the enemy plane is a threat based on a determination that the enemy plane is carrying a weapons payload capable of inflicting critical damage to the location A. In an alternative embodiment, the intent analysis may determine that an enemy invasion is high likely based on a plurality of enemy forces approaching a given location or border.

The find analysis 500 addresses detecting the potential observables 514 associated with the target object 202 under analysis. The fix analysis 502 may include integrating and fusing multi-source/multi-INT detections in order to determine the benefit to improving a determination of location of the target object 202. The track analysis 504 may include fusing multi-source/multi-INT observations over time in order to assess the probability of creating and maintaining tracks or persistent knowledge of the target object 202. The intent analysis 508 may derive a probability of determining intent of the target object 202 based on the quality and quantity of the known observables 530.

The entity specific parametric inputs 300 and confidence & quality parametric inputs 380 may include the platform 260, sensor 270, and observable specific input parameters that describe a probability of successfully detecting, classifying, locating, identifying, or fusing each observable under differing environmental conditions 302. The confidence and quality parametric inputs 380 may be utilized to drive the statistical distributions in the simulation modeling program 48 runs, and/or the quality parameters may provide the timeliness and accuracy of the detected observable. The timeline conditions 498 may provide the environmental conditions 302 to account for varying sensor and processing capabilities under differing conditions such as visible light, cloud cover, RF spectrum, and sea state; to give a few non-limiting examples.

Further results may be derived based on output to and feedback from identifying 520 (e.g., identifying gaps 142 (FIG. 2), and identifying and/or mitigating 144 (FIG. 2)). Identifying analysis 520 may support analyzing track probabilities and derive a probability of determining an identity sufficient to support associating and fusing data into an existing track.

Tables are provided below to provide clarity for terms used above and in the remaining portion of the present disclosure. Table 1, below, provides a list of parametric inputs and a corresponding description. Table 2 provides a list of computed probability results. Table 3 provides a list of success results associated with the detection, locating, and tracking. Table 4 provides a list of abbreviations and acronyms, and corresponding descriptions.

TABLE 1

Parametric Inputs
Parametric Inputs

| Type | Parameter | Description |
| --- | --- | --- |
| Observable Parameters | $_iP_{OBS}$ | Probability that the observable exists where it is a single observable. |
| | $_iR_{OBS}$ | Rate of the observable (e.g., observations per 1 hour period for intermittent observable types): Ship on the surface may be 1. Optionally, SIGINT may be turned on and off, or include multiple transmissions. |
| | $_iP_{SEN}$ | Probability that the sensor is able to sense when coupled with $_iR_{OBS}$. |

TABLE 1-continued

Parametric Inputs
Parametric Inputs

| Type | Parameter | Description |
|---|---|---|
| Sensor Parameters | $_iR_{SEN}$ | Rate of the sensor to attempt to detect the observable when coupled with $_iP_{OBS}$. |
| | $_iN_{TARGET\_OBJECTS}$ | Number of target objects in the field of analysis. |
| | $_iN_{OTHER\_OBJECTS}$ | Number of other objects in the field of analysis (e.g., similar objects that are not the specific targeted objects of interest). |
| | $_iP_{SEN\_AV}$ | Probability of the sensor being physically available (e.g., in the area and capable of sensing the observable). |
| | $_iP_{SEN\_TASK}$ | Probability of sensor being tasked to collect or detect this observable. |
| | $_iP_{SEN\_DET}$ | Probability of the sensor to sense or detect the observable, and may include associated processing. The probability may be expanded separately for environmental conditions. |
| | $_iP_{SEN\_CLSFY}$ | Probability of the sensor being tasked to produce a sufficient identification or typing to support fusion for the observable, if the observable is detected. |
| | $_iP_{SEN\_LOC}$ | Probability of the sensor being tasked to produce a sufficient location to benefit fusion for the observable, if the observable is detected and classified. |
| | $_iT_{SEN}$ | Time for the sensor and associated processing to generate a detection (e.g., time available to report in hours). |
| | $_iQ_{SEN}$ | Quality of the produced product (e.g., how well it contributes to the find, fix, track process), which may focus on an overall quality of the detected location. 0-1: 0 may signify no contribution. 1 may signify a provided ID and sufficient location for the detection, on its own, to provide the location of the detection, a % between 0 and 1 to identify the overall quality as defined in Table 5, below. |
| | $_iR_{SEN}$ | Cycle Rate of the sensor corresponding to the observable (e.g., effective sensed sample rate). SIGINT - 1 detect per sensor per observable (although multiple sensors make be used and combined). Imagery - 1 to n detects per take or frame rate of the sensor. |
| | $_iN_{SEN}$ | Number of sensors. |
| Sensor False Detection | $_iRFD$ | Rate of false detections over time for this sensor and associated processing, (e.g., RFD may indicate that 1.5 false detections will be generated per day). |
| | $_iPFD$ | Probability of false detections per valid detections for this sensor and associated processing (e.g., 2% PFD indicates 2 out of 100 detections are false). |
| Fix Fusion Parameters | $_iP_{FIX\_PR\_SUCCESS}$ | Probability of successful fusion across an INT pair. |
| | $_iT_{FIX\_AVG\_FUSE}$ | Average time for the data combination to fuse Including queue time awaiting processing and analysis time to fuse the data. |
| | $_iQ_{FIX\_PR\_SUCCESS}$ | Average quality improvement of a successful fusion across an INT pair represented as a % of improvement (e.g., .1 represents a 10% improvement of the location over the best quality in the INT pair). It is possible for the improvement to be 0% such that the fusion of the data is of value for confirmation (e.g., supports the tracking process) but does not improve the overall quality of the location. |
| | $_iN_{ANALYSTS}$ | Number of fix fusion analysts. |
| | $_iN_{FUSION\_ENGINES}$ | Number of fix fusion engines to support automated fusion. |

TABLE 1-continued

Parametric Inputs
Parametric Inputs

| Type | Parameter | Description |
|---|---|---|
| Other Parameters | $iT_{INTERVAL}$ | Total analysis period (e.g., hours). |
| | $iT_{SLICE}$ | Time sub-interval used by a simulation modeling program for collecting detection to fuse. |

TABLE 2

Computed Results Description Table

| Type | Parameter | Description |
|---|---|---|
| Single Observable Detection | P, T, Q, $N_{DET\_OBS}(o)$ | For each observable (o). |
| | P | Probability of detection. |
| | T | Time to detect and/or process to generate a detection. |
| | Q | Quality of the detection. |
| | N | Number of single intelligence detections. |
| INT Detection | P, T, Q, $N_{DET\_INT}(i)$ | All observables within the intelligence - for each INT (i). |
| Across all INT Detections | P, T, Q, $N_{DET}$ | Best case available performance (e.g., for the analysis period) |
| Fused Pair Combinations across INTs | P, T, Q, $N_{FIX\_CMBO}(c)$ | For each fix fusion combination (c) across all types. |
| Fix Fusion | P, T, Q, $N_{FIX\_FUSE}$ | Fused combinations across all data sets (e.g., for the analysis period) |
| | $P_{FIX}$ | Overall probability of an improved location based on fused data. |
| Track Fusion | P, T, Q, $N_{TRACK\_FUSE}$ | Track across all find and fix results (e.g., for the analysis period). |
| | $P_{TRACK}$ | Overall probability of maintaining track on the object based on all available intelligence products. |

TABLE 3

Success Probability Description

| Type | Parameter | Description |
|---|---|---|
| Detections | $P_{DET}$ | Probability of successful detection across all INT groups. |
| | $T_{DET}$ | Average time for the associated data to be available for fusion. |
| | $Q_{DET\_LOC}$ | Location quality associated with the $P_{DET}$. |
| | $R_{DET}$ | Number of true detected products forwarded excluding not false detections. |
| Locations | $P_{FUSE}$ | Probability of successful fusion for a specific INT pair combination. |
| | $T_{FUSE}$ | Average time for the combined fusion to be available. |
| | $Q_{LOC}$ | Probability of successful location associated with the $P_{FUSE}$. |
| | $P_{FIX}$ | Probability of a successful fix across all available INTs. |
| | $T_{FIX}$ | Average time for the final fused result to be available. |
| | $R_{FIX}$ | Number of fused products forwarded. |
| Track | $P_{TRACK}$ | Probability of a successful track. |

TABLE 4

Abbreviations and Acronyms

| Acronym | Description |
|---|---|
| AIS | Automatic Identification System |
| AMD | Asymmetric Missile Defense |
| BF | Blue Force |
| BFA | Blue Force Asset |
| COMINT | Communications Signals Intelligence |
| ELINT | Electronic Signals Intelligence |
| EO | Electrical Optical |
| FISINT | Foreign Instrumentation Signals INTelligence |
| FMV | Full Motion Video |
| GMTI | Ground Moving Target Indicator |
| HUMINT | Human Intelligence |
| INT | Intelligence |
| IR | Infrared |
| ISR | Intelligence, Surveillance and Reconnaissance |
| MOE | Measures Of Effectiveness |
| NATO | North Atlantic Treaty Organization |
| NIS | NATO Identification System |
| OBS | Observations Set or Set of Observations |
| PED | Processing, Exploitation and Dissemination |
| PIFBA | Probability Integration Fusion Benefit Analysis |
| RCAF | Royal Canadian Air Force |
| RIVMC | Raytheon Intelligence Value Metric Calculus |
| RFT | Red Force Threat |
| SAG | Surface Action Group |
| SME | Subject Matter Expert |
| STANAG | Standardization Agreement |
| VT | Vulnerability-Techniques |

Figure 15:
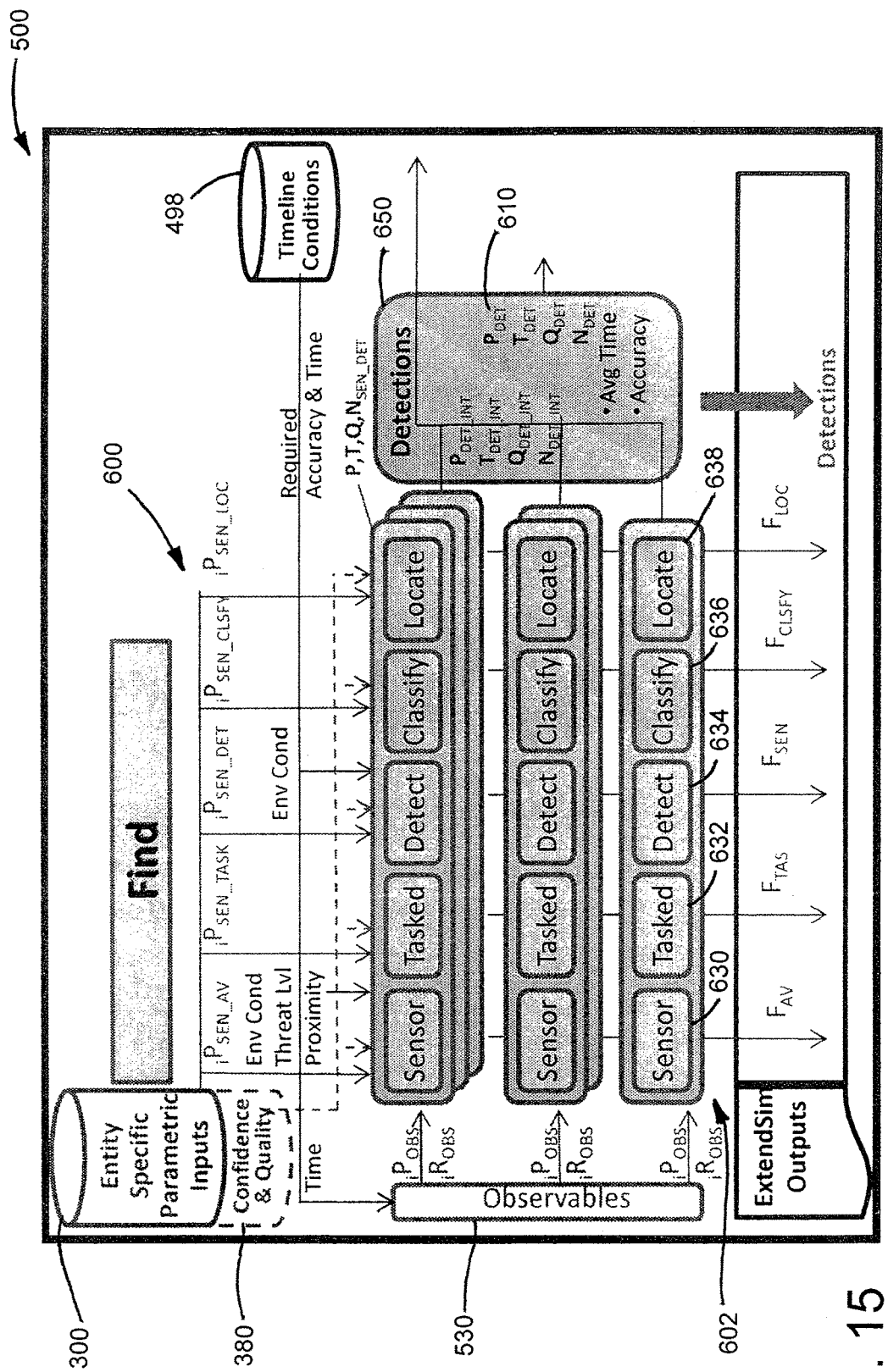
FIG. 15 is a flow chart of the method of finding of FIG. 13.

FIG. 14 is a detailed flow chart of the methods of FIG. 13. Table 1, above, provides a detailed description of the individual input parameters 600 (e.g., $iP_{SEN\_AV}$ and $iP_{SEN\_TASK}$) and computed output probability parameters (e.g., $P_{DET}$ 610, $P_{FIX}$ 612, $P_{TRACK}$ 614, etc.). FIG. 15 is a flow chart of the method of finding 500.

The find analysis 500 may analyze the probability of successful detections, including the number of detections, timeliness, quality, and failure statistics shown in FIG. 15. Tables 1-3 provide a description of the input parameters 600 and the failure statistics 602. Detections may be derived by sensing 630, tasking 632, detecting 634, classifying 636, and/or locating 638. A determination of a number of occurrences and interval of an occurrence may be determined based on each observable 530 to provide one or more of the input parameters 600.

Sensing 630 may determine the probability that the platform 260 and sensor 270 are available in the area of interest and that the target object 202 is in range or field of view of the sensor. Tasking 632 may determine the probability that the sensor 270 is tasked to detect the target object 202. Detecting 634 may determine the probability that the sensor 270 and associated processing will detect the target object 202 under the current environmental conditions 302 as defined in the timeline conditions 498. Classifying 636 may determine the probability that the detection provides sufficient object classification to allow the detection to be associated with either this target object 202 or this class of objects. Locating 638 may determine the probability that the detection provides the location of the target object 202 and to what quality or accuracy.

Detections 650 may include integrating together all the detections of each intelligence tool (e.g., platform 260 and/or sensor 270), and then integrating together the probability, timeliness, and/or quality of all detections within the analysis window to provide the overall probability of detecting the target object 202. The average timeliness of successful detections may be provided to determine whether enough time is available to implement an intelligence tool (e.g., a platform 260 and/or analysis).

Analyzing results 140 may include an intelligence value metric calculus, which may be based on one or more sets of equations to derive the finding analysis 500, fixing analysis 502, and/or the tracking analysis 504. Details of an exemplary embodiment of the equations are discussed below. The finding analysis 500 may be derived from a single observable input, a single observable detection, a single intelligence detection, and/or a detection across intelligence groups.

Equation Set 1: Single Observable Input

Single observable input equations may provide measures of effectiveness (MOEs) derived through a combination of initial user inputs (denoted with the letter i preceding the equation variable) and computed quantities that may be derived from these inputs. The method by which user inputs are converted to probabilities is important to determining the confidence intervals associated with these MOEs.

A number of potential observables is ($N_{OBS}(o)$) for each target object 202 (FIG. 5). Sensor 270 (FIG. 6) pairing is based on a rate of the observable occurrence ($iR_{OBS}$), a rate of the sensor 270 to attempt to detect ($iR_{SEN}$), and a number of sensors ($iN_{SEN}$) being used. A number of opportunities to detect for a single observable object may be derived from the number of potential observables, rate of observable occurrence, and rate of the sensor to attempt detection.

A number of potential observables for intelligence types that generate observations (e.g., EO and IR) may be determined with based on following equation:

$$N_{OBS}(o) = iP_{OBS} * iR_{SEN} * iN_{SEN} * iT_{INTERVAL} \quad (1.1)$$

A number of potential observables for intelligence types that provide surveillance of a region, looking for generated activity (e.g., SIGINT) may be determined based on the following equation:

$$N_{OBS}(o) = iR_{OBS} * iP_{SEN} * iN_{SEN} * iT_{INTERVAL} \quad (1.2)$$

The total number of opportunities to detect observable objects is increased by the number of targeted and non-target or other objects in the sensor(s) 270 field of view. A target object is an object that is of the same type and characteristics of the target object 202 (e.g., an object the find analysis 500, fix analysis 502, and track analysis 504 determine probabilities for). For example, if a surface action group (SAG) containing 4 ships is targeted, then the number of targeted objects ($iN_{TARGETED\_OBJECTS}$) is 4. If there are 6 commercial vessels and a force ship in the area, then the number of other similar objects that may generate observables 514 ($iN_{OTHER\_OBJECTS}$) is 7.

Therefore while the analysis is to determine the probability of successfully finding and tracking a single ship, the overall processing and fusion effort may deal with many observables of non-interest, such as other observables 532 and non-observables 534 (FIGS. 13 and 14). A total number of observations may increase, which may greatly increase the number of items that the analyst or automated system (e.g., a computer system or a computer network) has to process in the later stages of fixing 502 and tracking 504. Each of these observables 514 ($N_{TOT\_OBS}(o)$) represents an observation opportunity, which can be determined from the following equation:

$$N_{TOT\_OBS}(o) = N_{OBS}(o) * (iN_{TARGET\_OBJECTS} + iN_{OTHER\_OBJECTS}) \quad (1.3)$$

An interval between observation opportunities and a rate of observation opportunities may affect the ability to fuse and the probability of a successful fusion.

Figure 16:
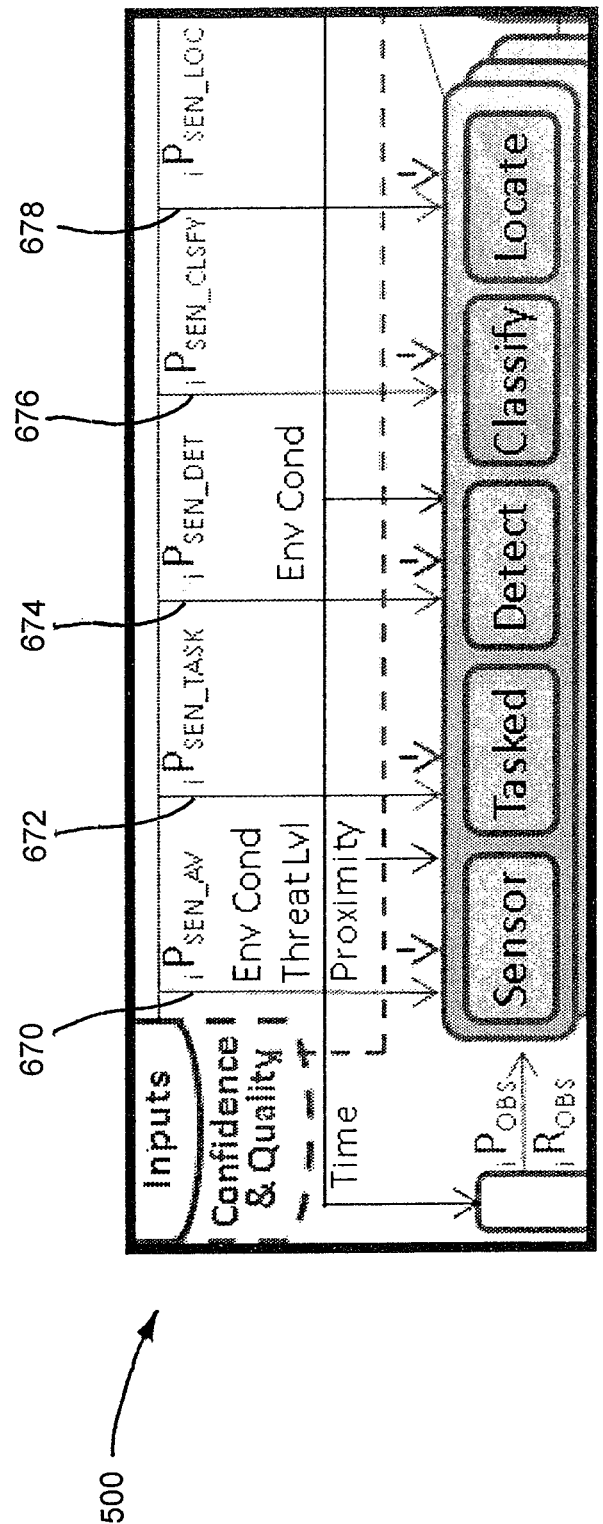
FIG. 16 is a flow chart of a single observable detection portion of the method of finding of FIG. 13.

FIG. 16 is a flow chart of a single observable detection portion of the method of finding of FIG. 13. Equation set 2 provides equations associated with detecting the single observable from a single sensor.

Equation Set 2: Single Observable Detection

Single observable detection equations may provide a probability of detecting a single object based on the following parameters described in Table 1, above: $iP_{SEN\_AV}$ 670; $iP_{SEN\_TASK}$ 672; $iP_{SEN\_DET}$ 674; $iP_{SEN\_CLSFY}$ 676; and/or $iP_{SEN\_LOC}$ 678.

A probability of a single observable being detected assuming the observable occurs (e.g., $P_{OCC}$ of 1) may be determined based on the following equation:

$$P_{SINGLE\_DETECT} = (iP_{SEN\_AV} * iP_{SEN\_TASK} * iP_{SEN\_DET} * iP_{SEN\_CLSFY} * iP_{SEN\_LOC}) \quad (2.1)$$

The probability of detecting the object is increased by having additional time ($iT_{INTERVAL}$) and additional observables or additional sensors to increase the opportunities to detect the object ($N_{OBS}$). Equation 1.1 calculated the number of observables ($N_{OBS}(o)$) based upon the rate of the observable, the sensor cycle rate, and the number of sensors. Equation 2.2 may adjust the single detect probability, assuming independent observations and time independence, for these increased detection opportunities based on the following equation:

$$P_{DET\_OBS}(o) = 1 - (1 - (P_{SINGLE\_DETECT}))^{(iT_{INTERVAL} * N_{OBS}(o))} \quad (2.2)$$

Due to sensor motion, the actual values of $iP_{SEN\_AV}$, $iP_{SEN\_TASK}$, and $iP_{SEN\_DET}$ vary with time, based on a relative location of the sensors 270 and the target object 202. The values may represent expected and/or average values across the observation period, which allows an assumption that multiple observations represent independent events with equal probabilities of detection. A dependence of detection probabilities on time (e.g., time of day) can be evaluated by generating time and environment dependent values for $iP_{SEN\_AV}$, $iP_{SEN\_TASK}$, and $iP_{SEN\_DET}$, $iP_{SEN\_CLSFY}$ and $iP_{SEN\_LOC}$ are not required to detect an object, but may be provided as described to support the detection analysis 500, as well as the fixing analysis 502 and the tracking analysis 504.

Additional parameters associated with the single detections may include an average time to detect and process each observable ($T_{DET\_OBS}(o)$), average location data quality of each observable ($Q_{DET\_OBS}(o)$), and the expected number of observables detected for a single object ($N_{DET\_SINGLE\_OBS}(o)$). $T_{DET\_OBS}(o)$, $Q_{DET\_OBS}(O)$, and $N_{DET\_SINGLE\_OBS}(o)$ may be based on equations 2.3, 2.4, and 2.5, following:

$$T_{DET\_OBS}(o) = \text{the detection and processing time}(iT_{SEN}(o)) \quad (2.3)$$

$$Q_{DET\_OBS}(o) = \text{the location data quality}(iQ_{SEN}(o)) \quad (2.4)$$

Quality refers to a level of accuracy with which observables are detected, fused, and tracked to derive ISR data products that reflect a desired output relative to an end user's data quality requirement (e.g., a set of mission objectives). The term accuracy is an average resolution for the ISR data product measurements. For example when the desired end product is a geolocation coordinate, then the accuracy is a set coordinate and the associated unit measurement within which those coordinates can be sited with confidence (e.g., within 1 mile). Table 5, below, describes an exemplary quality measurement normalization across intelligence products based on the product average accuracy.

TABLE 5

| | Quality Metric Description | | | |
|---|---|---|---|---|
| $iQ_{SEN}$ | SEN | Meters | Miles | Nautical Miles |
| 1.00 | if < | 1 m | 3 feet | 3 feet |
| 0.95 | if < | 2 m | 7 feet | 7 feet |
| 0.90 | if < | 4 m | 13 feet | 13 feet |
| 0.85 | if < | 8 m | 26 feet | 26 feet |
| 0.80 | if < | 16 m | 17 yards | 17 yards |
| 0.75 | if < | 32 m | 35 yards | 35 yards |
| 0.70 | if < | 64 m | 70 yards | 70 yards |
| 0.65 | if < | 128 m | 140 yards | 140 yards |
| 0.60 | if < | 256 m | 280 yards | 280 yards |
| 0.55 | if < | 512 m | 560 yards | 560 yards |
| 0.50 | if < | 1.024 km | 0.64 miles | 0.55 NM |
| 0.45 | if < | 2.048 km | 1.27 miles | 1.11 NM |
| 0.40 | if < | 4.096 km | 2.55 miles | 2.21 NM |
| 0.35 | if < | 8.192 km | 5.09 miles | 4.42 NM |
| 0.30 | if < | 16.384 km | 10.18 miles | 8.85 NM |
| 0.25 | if < | 32.768 km | 20.36 miles | 17.69 NM |
| 0.20 | if < | 65.536 km | 40.72 miles | 35.39 NM |
| 0.15 | if < | 131.072 km | 81.44 miles | 70.77 NM |
| 0.10 | if < | 262.144 km | 162.89 miles | 141.55 NM |
| 0.05 | if < | 524.288 km | 325.78 miles | 283.09 NM |
| 0.00 | | | | |

$$N_{DET\_SINGLE\_OBS}(o) = (N_{OBS}(o) * P_{SINGLE\_DETECT}) \quad (2.5.1)$$

The number of detections may be the max number of detections ($N_{OBS}(o)$) scaled by the probability of detecting the object ($P_{SINGLE\_DETECT}$). The total number of detections may be multiplied by the number of target objects 202 that are in the sensor range ($iN_{TARGET\_OBJECTS}$) to determine the total number of detections ($N_{DET\_OBS}(o)$).

$$N_{DET\_OBS}(o) = (N_{DET\_SINGLE\_OBS}(o) * iN_{TARGET\_OBJECTS}) \quad (2.5.2)$$

Each sensor may have different sensing characteristics (e.g., visibility, cloud cover, spectrum, and sea state) and may be affected by variations in aspects of the sensing environment. Table 6 is an exemplary list of information about each sensor and a plurality of variables that affect each sensor. This table shows the environmental parameters for each sensor type and how they are utilized to calculate the $iP_{SEN\_DET}$ value used in equation 2.1 above.

TABLE 6

| | | Visibility | Cloud Cover | | | Spectrum | | | Sea | | |
|---|---|---|---|---|---|---|---|---|---|---|---|
| | | | | | | | Noisy/ | | | | |
| INT | $P_{SEN}$ | Day/Night | Clear | Partial | Overcast | Clear | Spoof | Jammed | <=3 | >3 | Formula |
| COMINT ELINT FISINT | | | | | | X | X | X | | | Select $P_{SEN}$ based solely on Spectrum environment (e.g., clear is default) |
| EO | Use cloud cover | $P_d$ | $P_d$ | $P_d$ | $P_d$ | | | | $P_d$ | $P_d$ | *If sea state is null then sea state = 1. *If cloud cover is null then clear is default. *If night then night*sea state. If day, then cloud cover*sea state. |
| IR | Use cloud cover | $P_d$ | $P_d$ | $P_d$ | $P_d$ | | | | $P_d$ | $P_d$ | *same as EO. |
| SAR | Use cloud cover | $P_d$ | $P_d$ | $P_d$ | $P_d$ | X | ^ | ^ | $P_d$ | $P_d$ | Only affected if jam is in the same spectrum. ^degraded. |
| OPIR | | | $P_d$ | $P_d$ | $P_d$ | | | | | | *If sea state is null, then sea state = 1. *If cloud cover is null, then clear is the default. *If day, then cloud cover*sea state. |
| LIDAR | | | $P_d$ | $P_d$ | $P_d$ | | | | $P_d$ | $P_d$ | Only affected if jam is in the same spectrum. ^degraded. |
| AIS | | | | | | X | X | X | | | *Select $P_{SEN}$ based solely on spectrum environment. Clear is the default. |

TABLE 6-continued

P_SEN Intelligence Selection Table

| INT | P_SEN | Visibility Day/Night | Cloud Cover Clear | Cloud Cover Partial | Cloud Cover Overcast | Spectrum Clear | Spectrum Noisy/Spoof | Spectrum Jammed | Sea <=3 | Sea >3 | Formula |
|---|---|---|---|---|---|---|---|---|---|---|---|
| Acoustic | X | | | | | | | | | | *Use day/P_SEN value. |
| FMV | X | X | X | X | X | | | | X | X | *If sea state is null then sea state = 1. *If cloud cover is null then clear is default. *If night then night*sea state. If day, then cloud cover*sea state. |
| MTI | X | X | X | X | X | X | ^ | ^ | X | | Only affected if jam is in the same spectrum. ˆdegraded. |
| HIS/MSI | X | X | X | X | | | | | X | | *If sea state is null then sea state = 1. *If cloud cover is null then clear is default. *If night then night*sea state. If day, then cloud cover*sea state. |
| OSINT | X | | | | | | | | | | *Use day/P_SEN value. |
| HUMINT | X | | | | | | | | | | *Use day/P_SEN value. |
| Cyber | X | | | | | | | | | | *Use day/P_SEN value. |

Figure 17:
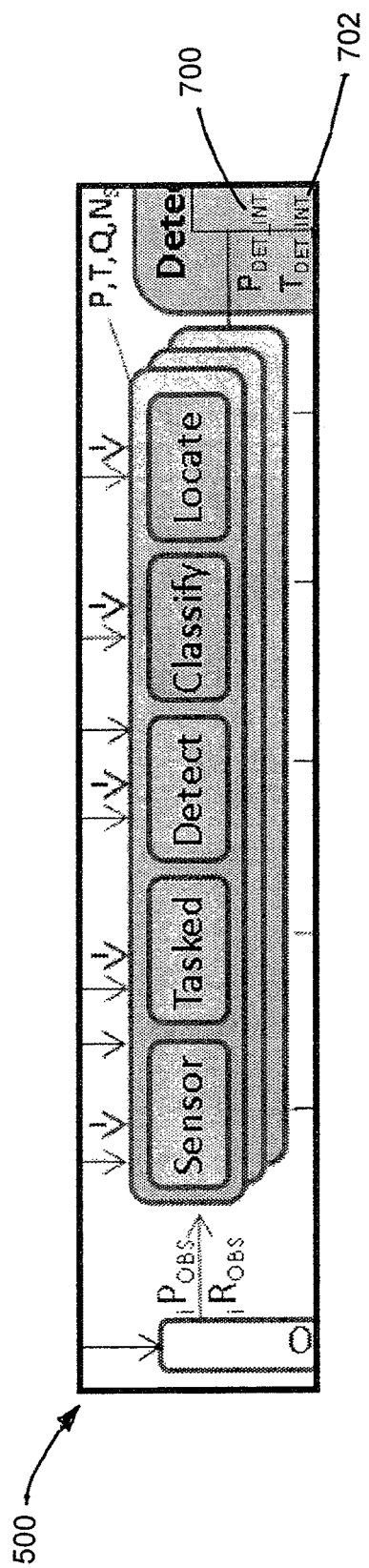
FIG. 17 is a flow chart of a single intelligence detection portion of the method of finding of FIG. 13.

FIG. 17 is a flow chart of a single intelligence detection portion of the method of finding of FIG. 13. Equation set 3, described below, provides equations associated with integrating, across sensors within an intelligence type, probabilities of detection for that intelligence type.

Equation Set 3: Single Intelligence Detection

Aggregating metrics associated with like sensors against the same observable such as three different sensors all attempting to image the same occurrence of the observable. This allows for the use of multiple sensors to provide intelligence type data to be used during a later fixing analysis 502.

$P_{DET\_INT}(i)$ 700 is a probability of a successful detection from any of the sensors to provide intelligence type. $P_{DET\_INT}(i)$ 700 is also the probability that any of the sensors were successful in detecting the observable. A successful detection is equal to 1 minus the product of all individual failures, for each intelligence type (i) in the set of intelligence types from each observable (o) from the available set OBS of all observables for each intelligence type (i), given by the following equation:

$$P_{DET\_INT}(i) = 1 - ((1 - P_{DET\_OBS}(1)) * (1 - P_{DET\_OBS}(2)) * \ldots \quad (3.1)$$
$$(1 - P_{DET\_OBS}(n)))$$
$$= 1 - \left(\prod_{o \in OBS} (1 - P_{DET\_OBS}(o))\right)$$

Equation 3.1 may assume that each different sensor detection is independent. Assuming independence is not entirely realistic, for example, different SIGINT collectors may all be affected by the power of a transmitted signal, but this assumption allows simplification of the association of different sensors to observable events.

The expected time for each intelligence type's result to be reported as well as available for fusion $T_{DET\_INT}(i)$ 702 is based on a weighted average time for each intelligence type's detection and processing. The level of each intelligence type's contribution to a successful result is used as the weighting factor in equation 3.2 as follows:

$$T_{DET\_INT}(i) = \Sigma_{o \in OBS}(N_{DET\_OBS}(o) * T_{DET\_OBS}(o)) / \Sigma_{o \in OBS} N_{DET\_OBS}(o) \quad (3.2)$$

Also, the expected data quality of each intelligence product may be based on the weighted average of each individual observable's potential contribution to the result as follows in equation 3.3:

$$Q_{DET\_INT}(i) = \Sigma_{o \in OBS}(N_{DET\_OBS}(o) * Q_{DET\_OBS}(o)) / \Sigma_{o \in OBS} N_{DET\_OBS}(o) \quad (3.3)$$

The expected total number of observable available for each INT (i) is given by the sum of each INT's observables in equation 3.4 as follows:

$$N_{DET\_INT}(i) = \Sigma_{o \in OBS}(N_{DET\_OBS}(o)) \quad (3.4)$$

Figure 18:
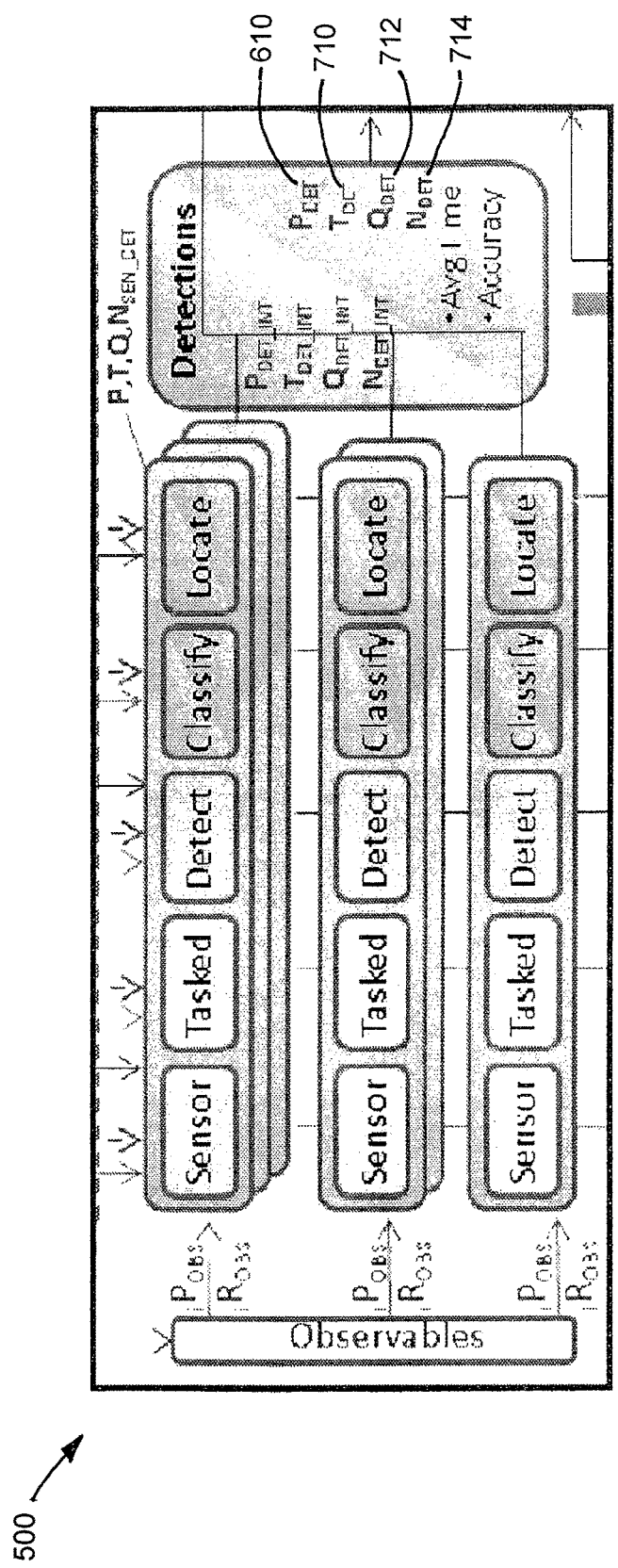
FIG. 18 is a flow chart of a group of intelligence detection analysis blocks to support the method of finding of FIG. 13.

FIG. 18 is a flow chart of a group of intelligence detection analysis blocks to support the method of finding of FIG. 13. Equations set 4, described below, provides equations associated with a probability of overall detections against the target object 202. This step may not involve improvement of the intelligence product, just the overall probability $P_{DET}$ 610 and number of detections $N_{DET}$ 714 that are expected.

Equation Set 4: Detection Across INT Groups

The best case probability of successful detection across all INT groups $P_{DET}$ 610 may be based on the following equation:

$$P_{DET} = 1 - (\Pi_{i \in INTs}(1 - P_{DET\_INT}(i))) \quad (4.1)$$

As with the above equations, equation 4.1 assumes that the different sensor detections are independent.

A weighted average time may be factored based on the probability and number of detections ($N_{DET\_INT}$) for each intelligence type, for example, as provided below in equation 4.2. The number of detections for each intelligence type ($N_{DET\_INT}$) may be based on the individual probability of detection for that observable with each sensor ($P_{SINGLE\_DETECT}$)) equation 2.1 above.

$$T_{DET} = \Sigma_{i \in INTs}(N_{DET\_INT}(i) * T_{DET\_INT}(i)) / \Sigma_{i \in INTs} N_{DET\_INT}(i) \qquad (4.2)$$

A weighted average location data quality across all intelligence types may be given by provided by equation 4.3 as follows:

$$Q_{DET} = \Sigma_{i \in INTs}(N_{DET\_INT}(i) * Q_{DET\_INT}(i)) / \Sigma_{i \in INTs} N_{DET\_INT}(i) \qquad (4.3)$$

A total number of expected detects across all intelligence types may be provided by the equation 4.4 as follows:

$$N_{DET} = \Sigma_{i \in INTs}(N_{DET\_INT}(i)) \qquad (4.4)$$

Figure 19:
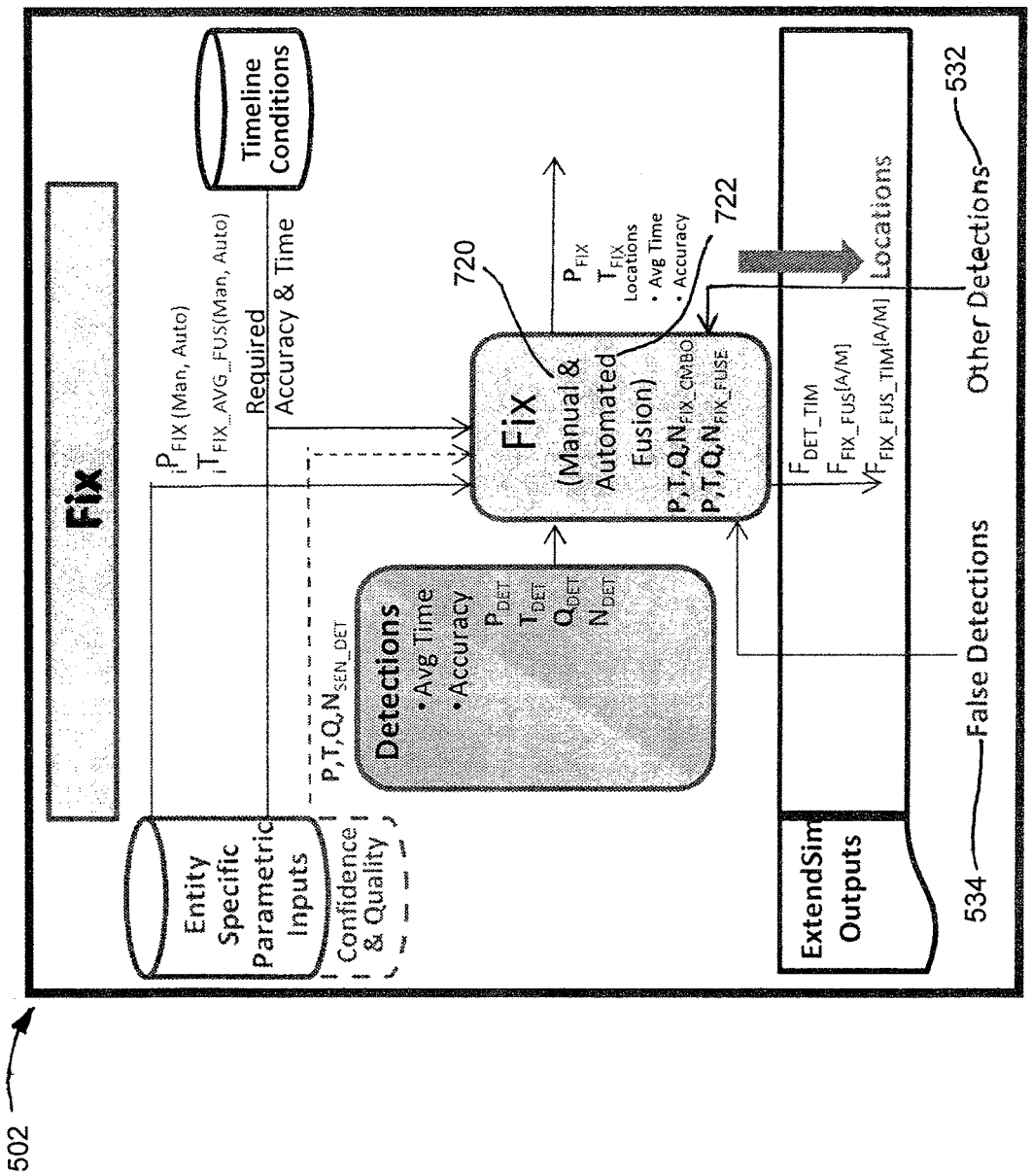
FIG. 19 is a flow chart of the method of fixing of FIG. 13.

FIG. 19 is a flow chart of the method of fixing of FIG. 13. The fixing analysis 502 (also referred to as "fix fusion analysis") may analyze a manual fix fusion 720 and an automated fix fusion 722 to improve the quality of the detected location. Fix fusion analysis 502 allows a determination of a probability of fusing multi-intelligence detections in order to improve the resulting location or quality of the detection. For example, the fix fusion analysis 502 may determine a fixed location of a single object, such as an enemy aircraft or a traffic light closest to a building. Fix fusion analysis 502 may compare effects and/or benefits of automated fusion 722 versus manual fusion 720 based upon given input parameters. The fusion quality can be negatively affected by the number of non-observables 534 detected and other observables 532 detected that can reduce the number of true detections that can be processed in the given time window, and can degrade the quality of the final location. The definition of the input parameters and failure statistics are presented in Tables 1-3 above.

Figure 20:
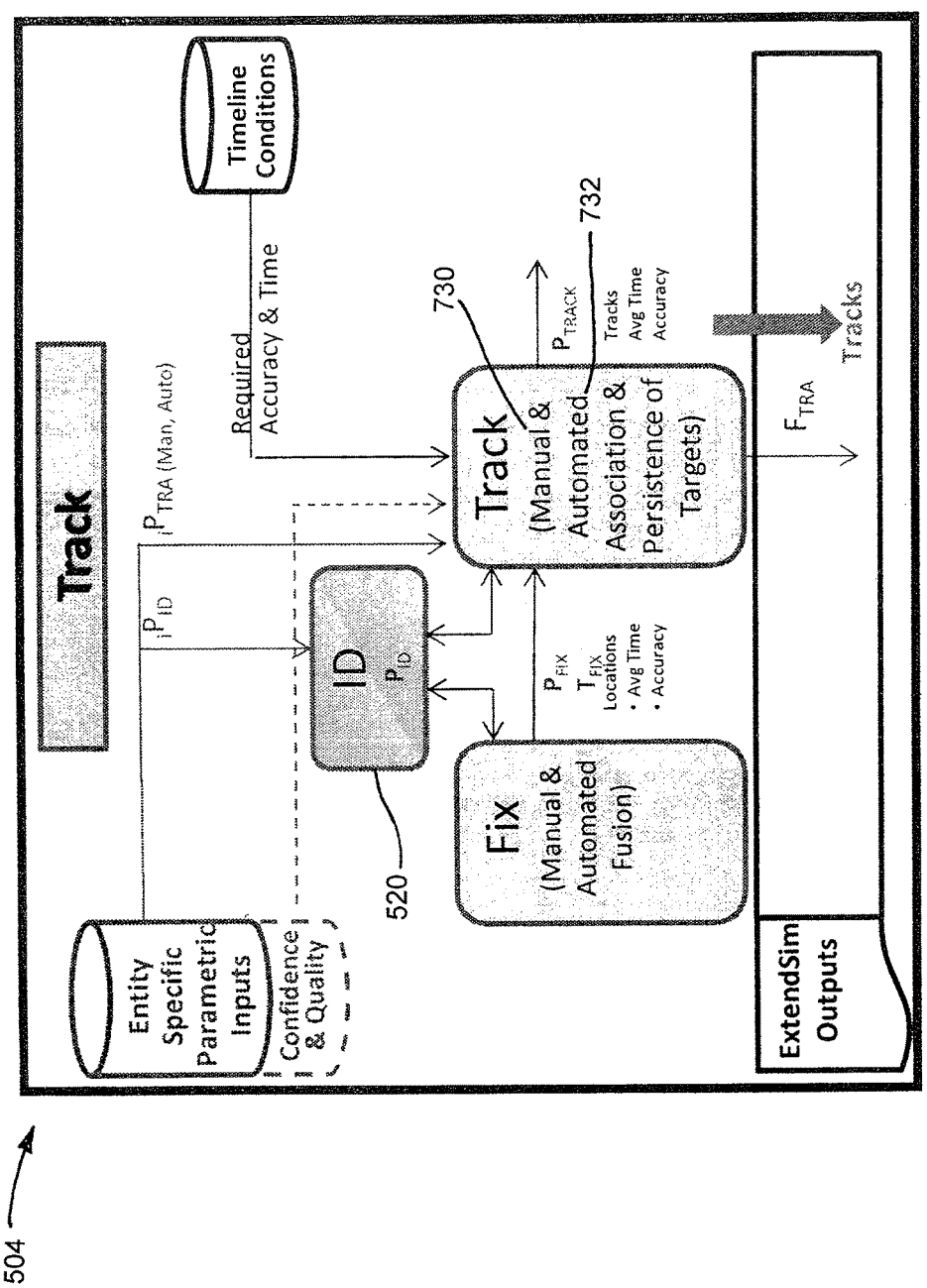
FIG. 20 is a flow chart of the method of tracking of FIG. 13.

FIG. 20 is a flow chart of the method of tracking of FIG. 13. The tracking analysis 504 (also referred to as "track fusion analysis") may analyze a manual track fusion 730 and an automated track fusion 732. Track fusion analysis 504 may estimate a probability of creating or sustaining tracks on a target object 202 (FIG. 5). Track fusion analysis 504 may involve a longer term association and persistence of knowledge related to the target object of interest. For example, track fusion analysis 504 may track a path of the target object 202, such a path of connecting traffic lights from a building A to a building B. Track fusion analysis 504 may involve a detection resulting from fix fusion analysis 502 and/or an individual detection that failed fix fusion analysis 502. High quality classification and/or identification allow association of each detection with the target object 202. A quality threshold may provide a minimum quality classification that must be met, based on each target of interest and mission requirement. For example, a day with cloud cover may result in low quality images, whereas a day with clear skies may result in high quality images. A mission requirement of merely detecting a piece of land or water may not require a high quality image, such as an image taken from a satellite during a day with some cloud cover. Alternatively, if the mission requirement is to detect numbers on a license plate of a vehicle, a clear day may be required.

The identifying 520 may analyze a probability of improving quality of detection classification information and/or an identification to support associating detections during the track fusion analysis 504.

Referring again to FIG. 2, identifying gaps 142 may include identifying steps in the timeline of events 104 where a probability of obtaining the desired intelligence is not sufficient to meet a mission requisite. Before attempting to identify gap mitigation 144, reviewing the simulation modeling program 48 "Not Tipped" values (or failure statistics) may indicate missed opportunities. Identifying a highest opportunity for increased performance and then addressing a lack of probability of success may indicate what changes to make. For example, if 90% of the tip failures are because no sensor was available to detect the target object 202, then adding sensors to may determine the required probability is met. Alternatively, if 90% of the tip failures are because the system failed to sense the target object 202, then providing a different sensor or technology may increase successful tipping. Table 7 shows the list of "Not Tipped" failure values with a description, generic potential causes, and mitigation steps.

TABLE 7

Not Tipped Failure Statistics With Potential Causes

| Type | Parameter | Description with Generic Causes and Mitigation |
|---|---|---|
| Detection | $F_{AV}$ | Observable not detected because the sensor was not available. |
| | $F_{TAS}$ | Observable not detected because the sensor was not tasked. |
| | $F_{SEN}$ | Observable not detected because the sensor or processing did not detect it. |
| | $F_{ID}$ | Detection processing did not generate sufficient ID to support fusion. |
| | $F_{LOC}$ | Detection and processing did not generate a location. |
| | $F_{DET\_TIM}$ | Detection and processing did not occur in the time allotted (e.g., reported too late). |
| Fix | $F_{FIX\_FUS}[A/M]$ | Detection did not fuse due to the fusion process (e.g., not everything will fuse). |
| | $F_{FIX\_FUS\_TIM}[A/M]$ | Failed to complete fix fusion in the time allotted (e.g., fix fused too late). |
| | $F_{FIX}[A/M]$ | Failed fix fusion due to exceeding amount of data that can be fused. |
| Track | $F_{TRA}$ | Track Failures |
| Intent | $F_{INT}$ | Intent Failures |

Identifying alternatives and/or mitigating 144 may include adding new items to the probabilities sheets (e.g., updating a database storing the probabilities), and then rerunning the simulation modeling program 48 analysis to provide new inputs for repeating analyzing results 140 until required results are obtained.

Changing available intelligence products and/or varying the environmental conditions 302 a cost-benefit analysis can compare differences between adding and/or removing platforms 260, sensors 270, and/or technology. The comparison allows a determination of a best use of assets to combine or utilize alone during different environmental conditions 302.

The above description refers to a series of spreadsheets that may be filled manually or automatically by a computer. In an embodiment, an analysis tool may perform one or more of the above steps that automatically and compute results for each performed step. For example, the analysis tool may operate on a computer system to process each step. Alternatively, portions of the analysis tool may operate on separate computers within a computer network comprising a plurality of computers operably connected to one another to process one or more portions of the above steps with the separate computers.

The above embodiments disclose steps that may be incorporated as instructions on a computer. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable instructions or executable instructions can be located in one logic or distributed between two or more communicating, co-operating, or parallel processing logics and thus can be loaded or executed in series, parallel, massively parallel and other manners.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of determining sensor detection probabilities of a system of platforms each having one or more respective sensors, the method comprising:
    determining a detection-parameters set of one or more combinations of platforms and respective sensors of the system of platforms based on a target object, environmental conditions affecting detection of the target object during a first point in time of a timeline of the target object, and sensing-and-positioning capabilities of each of the one or more combinations;
    deriving a time limit to detect the target object, the time limit being at a second point in time after the first point in time, and based on a threat level of the target object;
    updating the detection-parameters set based on the second point in time;
    deriving a time-to-process a detection of the target object by each of the one or more combinations;
    deriving an accuracy of each of the one or more combinations based on the target object, environmental conditions affecting detection of the target object during the first point in time, and the sensing-and-positioning capabilities of each of the one or more combinations;
    determining sensor detection probabilities of each sensor of the one or more combinations based on the second point in time, the time-to-process the detection of the target object, and the accuracy of each of the one or more combinations, wherein the sensor detection probabilities are below a probability threshold when the time-to-process the detection of the target object exceeds the time limit to detect the target object; and
    relocating the one or more combinations or one or more additional combinations of platforms and respective sensors to a region based on the sensor detection probabilities such that either the one or more additional combinations are relocated to the region to detect the target object; at least one of the one or more combinations are relocated to the region to detect the target object; or a plurality of the one or more combinations is relocated from a low threat level area to the region based on physical conditions including weather, temperature, time, and/or environment;
    whereby relocating the one or more combinations or the one or more additional combinations results in a most effective combination of the one or more combinations and/or the one or more additional combinations to monitor the target object or multiple other target objects across various locations and time based on the sensor detection probabilities.

2. The method of claim 1, further comprising:
    determining whether to add the one or more additional combinations to a region based on the sensor detection probabilities.

3. The method of claim 2, further comprising:
    relocating the one or more additional combinations to detect the target object.

4. The method of claim 1, further comprising:
    deriving a time-for-detection of the target object based on a derived number of detections of each intelligence type of the one or more combinations and a plurality of other combinations, and based on a derived time-to-report-result of each intelligence type of the one or more combinations and the plurality of other combinations.

5. The method of claim 1, further comprising:
    deriving a detection-quality based on a derived number of detections of each intelligence type of the one or more combinations and a plurality of other combinations, and based on a derived intelligence-product-quality of an intelligence product of each intelligence type of the one or more combinations and the plurality of other combinations.

6. The method of claim 1, wherein the sensing-and-positioning capabilities of each of the one or more combinations are based on historical data of the one or more combinations and subject matter expert data related to the one or more combinations.

7. The method of claim 1, further including:
    a method of fixing one or more locations of the target object based on the sensor detection probabilities; and
    a method of tracking based on the sensor detection probabilities and the one or more locations of the target object.

8. A computer network including a plurality of computers in electronic communication with one another, wherein at least one of the plurality of computers performs each step of the method of claim 1; and
    wherein the computer network is in electronic communication with the system of platforms and instructs the system of platforms to add the one or more additional combinations to the region, and wherein the system of platforms relocates the one or more additional combinations to the region.

9. The method of claim 1, further comprising:
determining an availability-probability that one or more of the platforms and the respective sensors will be available to detect an enemy observable based on a weighted average time.

10. The method of claim 1, further comprising:
determining whether the one or more additional combinations of the system of platforms has a higher probability of detecting the target object, compared to the one or more combinations, based on the time-to-process the detection of the target object, and based on an accuracy of each of the additional platforms and respective sensors.

11. The method of claim 10, wherein determining whether the one or more additional combinations has a higher probability of detecting the target object is further based on an intelligence method associated with the target object.

12. The method of claim 10, wherein determining whether the one or more additional combinations has a higher probability of detecting the target object is further based on fusion parameters of the one or more additional combinations, and based on fusion parameters of the one or more combinations.

13. The method of claim 12, wherein the fusion parameters include manual fusion parameters.

14. The method of claim 12, wherein the fusion parameters include automatic fusion parameters.

15. The method of claim 12, wherein the fusion parameters include a combination of manual and automatic fusion parameters.

16. The method of claim 1, further comprising:
deriving an object-detection-probability of detection of the target object based on the target object and an intelligence type of the one or more combinations.

17. The method of claim 16, wherein the target object includes a plurality of target objects; and
wherein deriving the object-detection-probability is further based on the plurality of target objects, an intelligence type of the one or more combinations, a plurality of other combinations of platforms and sensors of the system of platforms, and based on a quality metric.

18. The method of claim 1, wherein the target object includes a plurality of enemy vehicles;
wherein the target object includes a plurality of enemy weapons; and
wherein one or more of the plurality of enemy weapons is a missile.

19. The method of claim 1, wherein a plurality of the one or more combinations is relocated from a low threat level area to a high threat level area based on physical conditions including weather, temperature, time, and/or environment.

20. A method of determining sensor detection probabilities of a system of platforms each having one or more respective sensors, the method comprising:
identifying intelligence methods of a plurality of combinations of platforms and respective sensors of the system of platforms based on a plurality of target objects;
deriving probability parameters of each of the plurality of combinations, wherein the probability parameters include a detection-probability of detecting the plurality of target objects, a locating-probability of locating the plurality of target objects, and/or a tracking-probability of tracking the plurality of target objects;
mapping accuracy parameters and timeliness parameters of each of the plurality of combinations to the probability parameters, wherein the timeliness parameters include a time-to-process a detection of the plurality of target objects;
integrating fusion parameters of each of the plurality of combinations with the probability parameters, the accuracy parameters, and the timeliness parameters;
deriving a fused-detection-probability for each of the plurality of combinations detecting each target object of the plurality of target objects based on the integrated fusion parameters;
deriving tipped-detection probabilities based on the fused-detection-probability of each of the plurality of combinations detecting each target object, wherein the tipped-detection probabilities are below a probability threshold when the time-to-process the detection exceeds a time limit to detect the plurality of target objects; and
relocating the plurality of combinations or one or more additional combinations of platforms and respective sensors to a region based on the tipped-detection probabilities such that either the one or more additional combinations are relocated to the region to detect the plurality of target objects; at least one of the plurality of combinations are relocated to the region to detect the plurality of target objects; or a plurality of the plurality of combinations is relocated from a low threat level area to the region based on physical conditions including weather, temperature, time, and/or environment;
whereby relocating the plurality of combinations or the one or more additional combinations results in a most effective combination of the plurality of combinations and/or the one or more additional combinations to monitor the plurality of target objects or multiple other target objects across various locations and time based on the tipped-detection probabilities.

* * * * *